(12) United States Patent
Lochtefeld

(10) Patent No.: US 11,572,702 B2
(45) Date of Patent: Feb. 7, 2023

(54) METHOD AND APPARATUS FOR MANAGING AND CONTROLLING BREAKER WAVES IN A WAVE POOL

(71) Applicant: Thomas J. Lochtefeld, La Jolla, CA (US)

(72) Inventor: Thomas J. Lochtefeld, La Jolla, CA (US)

( * ) Notice: Subject to any disclaimer, the term of this patent is extended or adjusted under 35 U.S.C. 154(b) by 0 days.

(21) Appl. No.: 14/505,341

(22) Filed: Oct. 2, 2014

(65) Prior Publication Data

US 2015/0089731 A1 Apr. 2, 2015

Related U.S. Application Data

(60) Provisional application No. 61/885,720, filed on Oct. 2, 2013.

(51) Int. Cl.
*E04H 4/00* (2006.01)

(52) U.S. Cl.
CPC .................................. *E04H 4/0006* (2013.01)

(58) Field of Classification Search
CPC ....... E04H 4/145; E04H 4/143; E04H 4/0006; F04D 35/00; E02B 3/062
USPC ...... 4/497, 505, 491; 405/79, 80, 21, 26, 32, 405/35
See application file for complete search history.

(56) References Cited

U.S. PATENT DOCUMENTS

| | | | | |
|---|---|---|---|---|
| 3,460,166 A * | 8/1969 | Karl | ........................ | E04H 4/129 4/493 |
| 3,693,195 A * | 9/1972 | Richard | ................ | E04H 4/0006 4/491 |
| 3,755,829 A * | 9/1973 | Walklet | .................... | E04H 4/143 4/497 |
| 3,886,602 A * | 6/1975 | Stanwood | ............... | E04H 4/143 4/497 |
| 4,688,024 A * | 8/1987 | Gadde | ..................... | F41H 11/05 256/1 |
| 4,692,949 A * | 9/1987 | Dunn | .................... | E04H 4/0006 4/491 |
| 4,824,286 A * | 4/1989 | Waas | ....................... | E02B 3/062 405/27 |
| 4,894,873 A * | 1/1990 | Kiefer | .................... | E04H 4/143 4/497 |

(Continued)

*Primary Examiner* — Erin Deery
(74) *Attorney, Agent, or Firm* — J. John Shimazaki

(57) ABSTRACT

A wave pool having multiple wave breaking zones extending across the pool floor, wherein different wave breaking formations with different wave characteristics can be generated within each zone, using the same wave energy derived from the same original wave, wherein surfers with different abilities can surf in different locations within the same pool. Specific features are provided that enable breaker waves to be properly managed and controlled such that intermediate/advanced surfers can surf in one zone and beginner surfers can surf in another zone. Included are special dividers to prevent surfers from crossing from one zone to the next, while at the same time, allowing wave energy to pass through. An attenuating means is provided to help reduce the choppiness of the waves. Unique exit areas are provided along the sidewalls to enable surfers to exit from the wave pool at various locations, such as directly from the zones, so that surfers don't have to surf or traverse all the way to the shallow end to exit the pool.

16 Claims, 15 Drawing Sheets

(56) References Cited

U.S. PATENT DOCUMENTS

| | | | | |
|---|---|---|---|---|
| 4,905,326 A | * | 3/1990 | Nakamura | E04H 3/16 4/488 |
| 4,930,168 A | * | 6/1990 | Ferlise | E04H 4/129 4/489 |
| 5,205,670 A | * | 4/1993 | Hill | A63B 69/0093 405/52 |
| 5,271,692 A | * | 12/1993 | Lochtefeld | A63B 69/0093 405/52 |
| 5,342,145 A | * | 8/1994 | Cohen | E04H 4/0006 4/491 |
| 5,558,459 A | * | 9/1996 | Odenbach | E02B 3/062 405/21 |
| 5,603,189 A | * | 2/1997 | Levy | E04H 3/06 52/169.1 |
| 5,667,445 A | * | 9/1997 | Lochtefeld | A63B 69/0093 472/117 |
| 6,336,771 B1 | * | 1/2002 | Hill | A63G 31/007 405/79 |
| 6,460,201 B1 | * | 10/2002 | Lochtefeld | E04H 4/0006 4/491 |
| 7,451,499 B1 | * | 11/2008 | Trotter | E04H 4/065 4/487 |
| 8,496,403 B2 | * | 7/2013 | Lochtefeld | E04H 4/0006 4/491 |
| 9,267,301 B2 | * | 2/2016 | Aceves | E04H 4/14 |
| 2003/0180095 A1 | | 9/2003 | McFarland | |
| 2006/0253969 A1 | * | 11/2006 | Johnson | E04H 4/0006 4/491 |
| 2010/0011497 A1 | | 1/2010 | Johnson | |
| 2013/0130815 A1 | | 5/2013 | Lochtefeld | |

* cited by examiner

METHOD AND APPARATUS FOR MANAGING AND CONTROLLING BREAKER WAVES IN A WAVE POOL

RELATED APPLICATION

This application claims priority from U.S. Provisional Application Ser. No. 61/885,720, filed on Oct. 2, 2013.

FIELD OF THE INVENTION

The present invention relates to the field of wave pools and in particular wave pools having specific features that enable breaker waves to be properly managed and controlled such that intermediate/advanced surfing areas can be separated from beginner surfing areas.

BACKGROUND OF THE INVENTION

Wave pools have become extremely popular around the world. They generally comprise a wave generator located on one end and a sloped floor with a shoreline having a beach on the opposite end, wherein waves are formed by the generator that travel along the surface of the body of water until they break along the shoreline and spill onto the beach.

Wave pools of this type help create waves similar to those that exist in nature, but the predominant use of these wave pools has been to provide waves for those who desire to bob up-and-down in the deep end, and wade in the shallow breaking-wave part of the pool. Although attempts have been made in the past to create an enhanced wave pool with larger and more powerful waves suitable for surfing, the problem has been that these pools are predicated on historic wave pool designs, and when surfers attempt to ride these waves toward the shoreline, they are carried forward and across the body of water, toward the shallow end, which increases the risk of injury that can result from deep water surfers transitioning to shallower water and colliding into waders, etc.

An additional problem faced by conventional wave pools used for surfing is the economic value of such pools which is often diminished by the relatively low throughput they provide, i.e., the number of surfers who can enjoy riding the waves at any given time within the same pool. Also, enlarging pool size and the power of wave generators can be cost prohibitive.

What is needed, therefore, is a wave pool design having specific features that enable breaker waves to be properly managed and controlled such that intermediate/advanced surfing areas can be separated from beginner surfing areas, and wherein exit areas are provided intermittently across the wave pool to enable surfers to exit properly without interfering with the progress of the waves and without the surfer having to travel all the way to shore.

SUMMARY OF THE INVENTION

The present invention preferably relates to wave pool designs that are configured with wave generators located on one end (the deep end) and a sloped inclined floor and beach located on the opposite end (shallow end), and in order to help solve the problems mentioned above, the invention preferably comprises the following additional elements:

First, the pool floor is preferably divided into multiple sections, each comprising at least one inclined floor section followed by at least one declined and/or level floor section, wherein by placing these sections back to back along the length of the wave pool, multiple wave breaking zones can be created, including a first breaker zone that creates one type of wave formation, and a second breaker zone that creates another type of wave formation, etc. This way, different wave formations having different wave breaking characteristics can be created in various locations throughout the wave pool, and by positioning these breaker zones back to back, i.e., one after the other, various wave breaking formations can be formed by the same wave, wherein they can break, reform and re-break again as they flow across the zones, thereby providing different wave characteristics within different sections within the same wave pool using the same wave energy. Furthermore, by having the depth and other characteristics of the wave breaking zones (the shoaling reef area) differ from one zone to the other, the same wave pool can be adapted to generate various types of waves with different wave breaking characteristics, such that surfers with different skill levels and abilities can ride on different waves at the same time in different areas within the same pool. Each wave breaking zone can have alternate reef designs, e.g., in the shape of a V from above, creating an 'A-Frame' peaking wave that progressively breaks initiating from the middle of the pool and down its length towards the pool sides; or in a diagonal line across the length of the pool, creating a progressively breaking wave from one side of the pool to the other; or, straight across the pool and allowing the timed differential sequencing of generated swell to interact in a progressive manner with the straight reef to break in correspondence with the generator movement, or focus on a particular location on the straight reef.

Second, to keep the surfers who are surfing within each zone from crossing over and into an adjacent zone within the same pool, i.e., to keep surfers having substantially the same skill level within the same zone, a special barrier is preferably provided that extends between the zones and helps prevent surfers from crossing over from one zone to another. At the same time, the special barrier preferably enables the waves and wave energy to pass through, such that essentially the same wave can travel from one end of the pool to the opposite end, through the various zones, wherein different wave characteristics can be formed using the same wave and wave energy. In one embodiment, the special barrier is made using a grill, grate, mesh or net or other suitable material having perforations that allow water and wave energy to pass through, but at the same time, provides a barrier to prevent surfers from crossing over from one zone to the next. In such case, the special barrier, such as a safety grill or net, is preferably anchored to the floor and extends up above the surface level of the body of water, and can be connected along the surface to a cable or line pulled across the wave pool to keep the barrier in place.

Third, to dampen unwanted parasitic or spurious waves and thereby reduce the choppiness of the desired surfing waves that travel from one zone to the next, an additional attenuating means is preferably extended along the surface of the body of water in association with the special barrier, such as above or near the barrier. In the preferred embodiment, this attenuating means preferably comprises a line with multiple floating members or coils extended above or near the special barrier, which helps dampen the surface action of the waves as they pass through the barrier. In such case, the floating coils preferably allow longer period surfing waves to pass through virtually unaffected, while at the same time, they help to attenuate and dampen the shorter period parasitic or spurious waves, which can help reduce the choppiness of the surfing waves without significantly reducing amplitude. A similar function can be achieved by a wall with perforations having a predetermined porosity, or a mesh with relatively small openings positioned above or near the special barrier that can help reduce the rate at which water is allowed to pass through from one zone to the next.

Fourth, as an added feature to enhance the spectator element of the wave pool, the preferred embodiment preferably comprises one or more elevated viewing decks that can be extended across the wave pool (like bridges extended over the special barriers) and/or along the side or end thereof. When bridges are used, they preferably extend over the special barriers that separate the zones, wherein the attenuating means can be provided directly beneath each one such that they can be hidden from view. Preferably, the decks or bridges are extended a sufficient distance above the wave pool such that the waves can pass through underneath without any interference. The bridges can be shaped in any manner, such as in the shape of a V from above, including in a shape that follows along the plan view shape of the breaker zones. This way, close-up viewing of the surfing zones can be provided. Bridges are preferably extended across the width of the pool from one side to the other. A deck can also be provided along the sides and/or far end of the wave pool. In either case, steps are preferably provided up to the walkway that extends to the bridges or decks around the perimeter of the wave pool.

Fifth, to enable surfers to exit from the wave pool within the various zones, which prevents them from having to surf or otherwise traverse all the way down the length of the pool to get out (due to the height of the side walls which can make it difficult for surfers to climb out of the wave pool), the wave pool preferably has multiple exit areas along the side walls associated with each zone from which the surfers can exit directly from the wave pool. Preferably, these exit areas extend inward along the sidewalls along the breaker zones to enable surfers to exit out of the water adjacent to each breaker zone. These exit areas preferably comprise inlets or openings which are intentionally kept as small as possible in an effort to help reduce the potential negative wave effects that can occur by having multiple openings extended along the sidewalls through the various zones. Moreover, in the preferred embodiment, additional wave dampening features are preferably provided within each inlet/opening that can help reduce wave reflections and unwanted spurious or parasitic wave phenomena that can negatively affect the progress of the waves that travel through the pool.

For example, one or more of the following wave dampening features can be provided on each exit area:

1) the exit area can have walls that are comprised of vertical padded grate bars that can be extended upward from the floor which are spaced a predetermined distance from each other and have a predetermined porosity to help allow some water to pass through, while at the same time, help dampen the wave energy associated with the wave motions entering into the inlet/opening;

2) a sloped ramp that the surfers can use to exit the wave pool can be extended within a channel that extends in a direction opposite the travel direction of the waves, such that any wave motion that enters into the channel can be reflected back and forth and thereby dampened;

3) the sloped ramp can be made of padded grate bars that are spaced a predetermined distance from each other with a predetermined porosity such that they help to dampen the wave energy that can reflect back and forth within the channel (which can be caused partially by wave motion being reflected by the vertical grate bars);

4) a wave dampening chamber can be located behind the vertical padded grate bars and beneath the ramp and walkway such as one consisting of an internal sloped floor and/or a wave dampening means consisting of a buoyant mesh material or vertical slats anchored to the floor extending vertically upward to help further dampen the waves;

5) an angled wall extending around the inlet opening that reflects wave energy toward the channel with the ramp located therein, wherein the channel is adapted with one or more wave dampening means, such as the vertical or sloped padded grate bars, and/or wave dampening chamber beneath it, as discussed above;

6) an opening with a secondary pool associated therewith having a sloped floor and sufficient dimensions to help disperse wave energy such that the likelihood of reflecting wave energy back into the pool is reduced; or 7) a smaller scallop cut-out from the top of the pool wall that is located above static water level, but when the wave progresses down the length of the pool, the rise in water level due to the passage of wave raises to just crest over the bottom of the scallop and allow the user to swim over the top of the scallop and slide into an adjacent separate exit area, similar to a seal or penguin that times its exit from the ocean concurrent with the surge onto an elevated coastal rock shelf.

The invention will now be discussed in greater detail in connection with the drawings.

BRIEF DESCRIPTION OF THE DRAWINGS

FIGS. 3a and 3b are additional section views taken along A-A of FIG. 1 wherein FIG. 3a shows the first half of the wave pool (the deep end) and FIG. 3b shows the second half of the wave pool (the shallow end), wherein the two figures can be placed end to end to represent a single section A-A taken along the length of the wave pool;

FIGS. 4a and 4b are details of the first bridge/deck shown in FIG. 1 wherein FIG. 4a is a plan view of the bridge/deck and FIG. 4b is an elevation view of the bridge/deck;

FIGS. 5a and 5b are details of the second bridge/deck shown in FIG. 1 wherein FIG. 5a is a plan view of the bridge/deck and FIG. 5b is an elevation view of the bridge/deck;

FIGS. 6a and 6b are details of one of the exit areas extending along the side walls wherein the exit area comprises a circular shaped inlet and a ramp extending within a channel, wherein FIG. 6a is a plan view of the exit area and FIG. 6b is an elevation view taken along section A-A of FIG. 6a;

FIGS. 7a and 7b are details of an alternate embodiment of the exit area extending along the side walls wherein the exit area comprises an angled wall and a similar ramp, wherein FIG. 7a is a plan view of the exit area and FIG. 7b is an elevation view taken along section A-A of FIG. 7a;

FIGS. 8a and 8b are details of another embodiment of the exit area extending along the side walls wherein the exit area comprises an energy reflecting angled wall and a similar ramp, wherein FIG. 8a is a plan view of the exit area and FIG. 8b is an elevation view taken along section A-A of FIG. 8a;

FIGS. 13a and 13b are details of the embodiment shown in FIG. 12, wherein FIG. 13a is an elevation view taken along section A-A of FIG. 12 and FIG. 13b is an elevation view taken along section B-B of FIG. 12;

FIGS. 15a and 15b are details of the embodiment shown in FIG. 14, wherein FIG. 15a is an elevation view taken along section A-A of FIG. 14 and shows the lowered wall, and FIG. 15b is an elevation view taken along section B-B of FIG. 14.

DETAILED DESCRIPTION OF THE INVENTION

Figure 1:
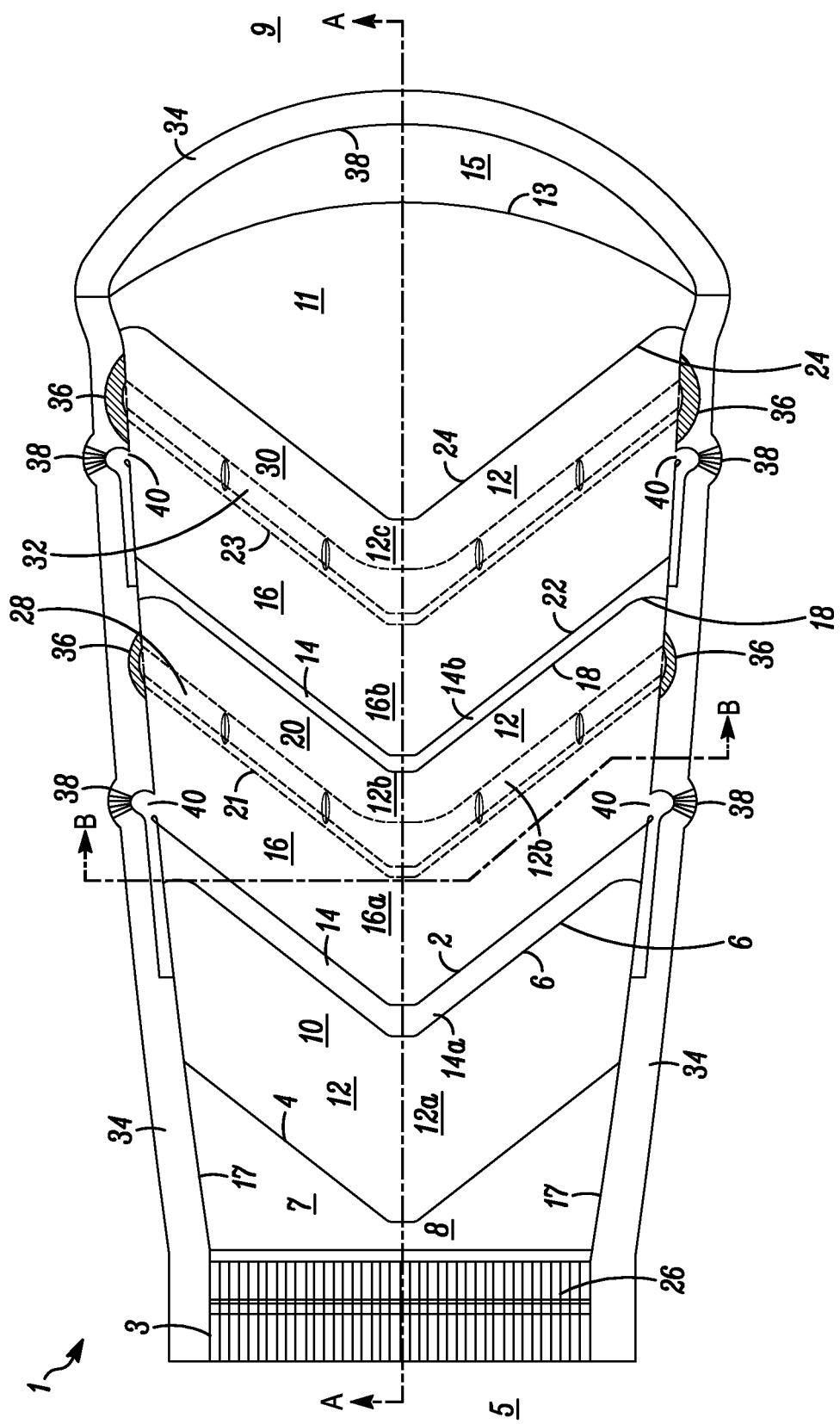
FIG. 1 is a plan view of a wave pool of the present invention comprising a plurality of wave-breaking zones extending across the pool floor, wherein each zone has a substantially inclined pool floor section followed by a substantially declined and/or level pool floor section, and each is in the shape of a V from above, wherein two viewing bridges/decks (shown by dashed lines) are extended across the wave pool over two of the zones.
Figure 9:
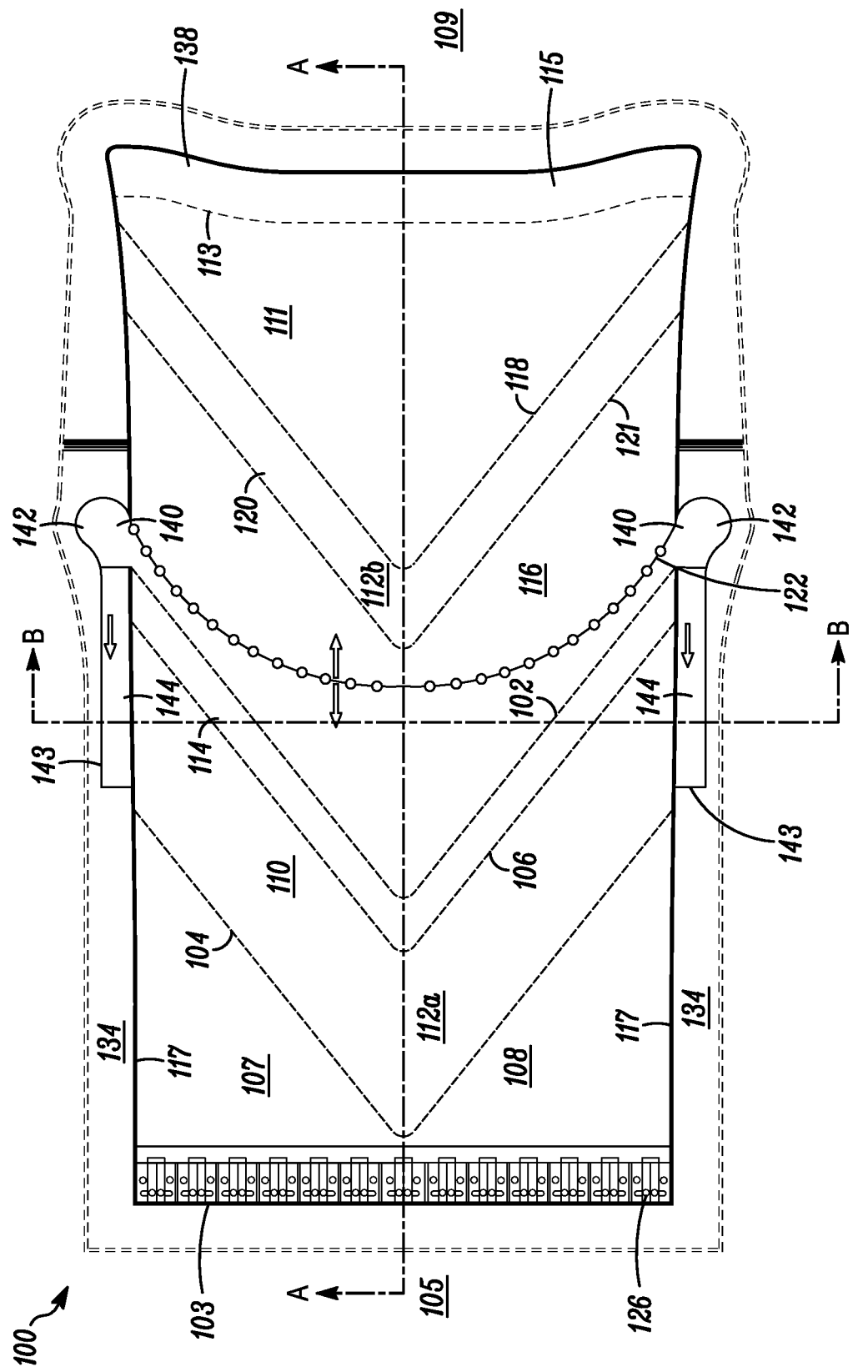
FIG. 9 is a plan view of an alternate wave pool embodiment wherein the side walls on either side extend substantially parallel to each other such that the waves progress forward without widening as they travel from the wave generator end to the beach end.

FIG. 1 shows a wave pool 1 of the present invention which comprises a series of wave generators 3 extended along a relatively deep end 5, i.e., shown on the left hand side of the drawing, and a pool floor 7 that extends from the wave generators 3 toward the opposite relatively shallow end 9, i.e., shown on the right hand side of the drawing, wherein a shoreline 11 with a beach 15 is extended thereon (as shown in relation to the zero depth line 13). In this embodiment, the side walls 17 extended on either side (shown at the top and bottom of the drawing) extend outward in a fan-shape such that the waves progressively widen as they travel from deep end 5 to shallow end 9, although as shown in FIG. 9, the side walls can extend substantially parallel to one another, or have a different configuration, as will be discussed.

Preferably extended across pool floor 7 are multiple wave-breaking zones, i.e., such as Zones 10, 20 and 30, shown in FIG. 1, extended back to back, one after the other, which allow different wave breaking formations with different wave characteristics to be generated within each zone. Each zone, i.e., Zones 10, 20, 30, etc., is preferably defined by an inclined section 12, followed by a declined and/or substantially horizontal section 14 (hereinafter "declined/horizontal section"), wherein between each zone there is preferably a wave reforming area 16, which is preferably relatively deep and allows the waves that pass from one zone to another to regenerate and reform, such that they can travel to the next zone, where the waves can reform and re-break again. Each zone is preferably configured in the manner shown in FIG. 1 wherein each inclined section 12 and each declined/horizontal section 14 are extended along a V shape from above (symmetrically along a center line represented by A-A). The angle of the V shape represents the peel angle of the waves to be formed which can be used to create the various wave formations that break along the length of wave pool 1.

Preferably extended directly in front of wave generators 3 is a first floor section 8 which is preferably substantially horizontally oriented, although not necessarily so, followed by each of the zones, beginning with Zone 10. Zone 10 preferably comprises inclined section 12a, which extends upward along a slope, such as 1:22, until it reaches the primary breaker line 6, which is then followed by declined/horizontal section 14a. The depths and slopes can be determined based on the desired type of wave to be generated within the zone. Thus, Zone 10 preferably begins along line 4, which represents the start of inclined section 12a, and extends through primary breaker line 6, which is then followed by declined/horizontal section 14a, which ends along line 2. Primary breaker line 6 preferably extends at the breaker depth for the waves and represents where the waves will begin to break within Zone 10. Again, the depth of primary breaker line 6 and slope of inclined section 12a, and declined/horizontal section 14a, are a function of the type of waves to be formed within that zone.

In FIG. 1, primary breaker line can be 2.4 meters deep, but that is only for exemplary purposes and by no means intended to be limiting. Virtually any range of depths and slopes can be provided as long as the desired effects are produced. In each instance, the depths and slopes can be substantially the same or vary along the width/length of the various sections, depending on the desired effects.

Downstream from Zone 10 and adjacent to line 2 is preferably a wave reforming area 16a, which is preferably extended substantially horizontally, although not necessarily so, such that the waves that break within Zone 10 can then reform and redevelop again as it travels toward Zone 20. Note that the present invention preferably uses the same wave energy that was required to form the original wave within Zone 10 to reform the wave within Zone 20.

Then, preferably extended downstream from reforming area 16a is the next Zone 20 which begins at inclined section 12b, along line 21, and extends through secondary breaker line 18, which is then followed by the declined/horizontal section 14b, which ends along line 22. Again, the depth of secondary breaker line 18 and slope of inclined section 12b, and declined/horizontal section 14b, are a function of the type of waves to be formed within that zone. Thus, Zone 20 preferably extends between line 21, which represents the start of inclined section 12b, and extends through secondary break line 18, which is then followed by declined/horizontal section 14b, which ends long line 22. Secondary breaker line 18 preferably extends at the breaker depth for the waves to be produced and represents where the waves will begin to break within Zone 20.

In FIG. 1, secondary breaker line 18 can be 1.2 meters deep, but that is only for exemplary purposes and by no means intended to be limiting. Virtually any range of depths and slopes can be provided as long as the desired effects are produced. Note again that in each instance, the depths and slopes can be substantially the same or vary along the width/length of the various sections, depending on the desired effects.

Then, downstream from Zone 20 and adjacent line 22 is preferably another wave reforming area 16b, which is preferably extended substantially horizontally, although not necessarily so, such that the waves that break within Zones 10 and 20 can then reform and re-break again as it travels toward Zone 30. Again, the present invention preferably uses the same wave energy that formed the original wave within Zone 10 to reform the waves within Zones 20 and 30. Then, preferably extended downstream from reforming area 16b is the next Zone 30 which begins at inclined section 12c, along line 23, and extends through tertiary breaker line 24, followed by shoreline 11, which preferably has an inclined slope of about zero to 1:22, although not necessarily so. Again, the depth of tertiary breaker line 24 and slope of inclined section 12c, are a function of the type of waves to be formed within that zone. In such case, unlike Zones 10 and 20, this Zone 30 does not have a declined/horizontal section 14, but instead, the slope of inclined section 12c extends upward to form shoreline 11, and continues upward along the same or similar slope, although not necessarily so, until it reaches the zero depth line 13 and forms beach 15. This slope preferably extends all the way up from pool floor 7 and onto beach 15, crossing what is designated as tertiary breaker line 24, which preferably extends at the breaker depth for the waves and represents where the waves begin to break and spill onto beach 15. Tertiary breaker line 24 also preferably extends along a V shape from above, and is followed by an area where smaller waves can spill onto beach 15, which is ideal for those who simply want to wade in the pool. The slope of shoreline 11 preferably continues to extend upward beyond zero depth line 13 and toward the far sidewall or edge 38, to form beach 15, as shown along the right hand side of FIG. 1.

In FIG. 1, tertiary breaker line 24 can be 0.7 meters deep, but that is only for exemplary purposes and by no means intended to be limiting. Virtually any range of depths and slopes can be provided as long as the desired effects are produced. Note that in each instance, the depths and slopes can be substantially the same or vary along the width/length of each of the sections, depending on the desired effects.

Based on the above, the arrangement of pool floor 7 is preferably as follows: First floor section 8 preferably extends from wave generators 3 to line 4 substantially horizontally. Zone 10 preferably extends from line 4, and begins with inclined section 12a, followed by primary breaker line 6, and ending with declined/horizontal section 14a, along line 2. Zone 20 preferably extends from line 21, and begins with inclined section 12b, followed by secondary breaker line 18, and ends with declined/horizontal section 14b, along line 22. Zone 30 preferably extends from line 23, and begins with inclined section 12c, followed by tertiary breaker line 24, and extends upward along shoreline 11, through zero depth line 13, and onto beach 15 along shallow end 9. Note that the depths shown in FIG. 1 are for exemplary purposes only—wave pool 1 can be designed with virtually any depth or slope that functions in the intended manner.

At the same time, the preferred configuration shown in FIG. 1 comprises breaker line depths that gradually decrease from deep end 5 to shallow end 9, i.e., from Zone 10 to Zone 30. The following is an example of a possible range of depths and slopes that can be provided across pool floor 7: First floor section 8 can be 6 meters in depth, ending along line 4, followed by Zone 10 which begins at inclined section 12a, and extends up along a slope of 1:22, until it reaches primary breaker line 6 at 2.4 meters deep, followed by declined/horizontal section 14a, which extends downward along a slope that is preferably greater than 1:22, until it reaches 4.0 meters in depth along line 2. This is followed by reforming area 16a, which is 4.0 meters deep, after which Zone 20 begins along line 21, which is also 4.0 meters deep, with inclined section 12b extending upward along a slope of 1:22, until it reaches secondary breaker line 18 at 1.2 meters deep, followed by declined/horizontal section 14b, which extends downward along a slope that is preferably greater than 1:22, until it reaches 2.0 meters deep along line 22. This is followed by reforming area 16b, which is 2.0 meters deep, after which Zone 30 begins along line 23, which is at 2.0 meters deep, with inclined section 12c extending up along a slope of 1:22, which continues upward along the same slope, passing through tertiary breaker line 24 at 0.7 meters deep, wherein shoreline 11 extends upward along the same slope, through zero depth line 13, and onto beach 15. In such case, the breaker line depths gradually decrease from 2.4 meters along primary breaker line 6, to 1.2 meters along secondary breaker line 18, to 0.7 meters along tertiary breaker line 24. Additional zones or fewer zones can be provided across wave pool 1 without departing from the present invention.

Wave generators 3 that are shown on the left hand side preferably comprise multiple wave generating caissons 26 that can be fired at once or intermittently in sequence, one after another, etc., to create waves that travel from deep end 5 to shallow end 9. A single wave is preferably created that travels forward through the various zones and reforming areas, i.e., from Zone 10, where the wave initially forms and breaks along primary breaker line 6, and then, to Zone 20, where the wave reforms and re-breaks along secondary breaker line 18, and then, to Zone 30, where the wave re-breaks again, along tertiary breaker line 24, wherein the wave eventually breaks and spills onto beach 15 along shoreline 11 and runs up toward shallow end 9.

FIG. 1 also shows two decks or bridges, 28 and 32, extending width-wise across wave pool 1, which are preferably positioned substantially over Zones 20 and 30, respectively, although not necessarily so. Each zone is extended along a V shape from above, and both decks 28, 32 are preferably extended along a similar V shape from above. That way, both decks 28, 32 are positioned in a manner that provides the best viewing area for spectators standing on the decks, i.e., each deck is preferably extended over the base of an inclined section 12, which is where the waves are regenerated and reformed, which allows the breaking portion of the waves to be in the open viewing areas, which can be extended on either side of decks 28, 32, which is where the surfers can perform surfing maneuvers on the waves. Decks 28, 32 are also preferably positioned over the areas extending between the zones, such that any dividing means that are provided (as will be discussed) can be hidden from view. Note that the forward edge of each deck 28, 32 is shown in dashed line and is intended to coincide with lines 21 and 23, respectively, of Zones 20 and 30. More than two or fewer than two decks can be provided.

Preferably, decks 28, 32 can be extended across wave pool 1 to provide up-close spectator viewing of surfers within Zones 10, 20 and 30. Decks 28, 32 are preferably extended above the body of water by a predetermined distance, such as 3.5 meters, such that they will not interfere with waves or surfers below, and are preferably supported on multiple columns 45 extending below and have steps 36 leading up to them from walkway 34.

Walkway 34 is preferably provided around the perimeter of wave pool 1 which allows for additional spectator viewing. Walkway 34 can extend all the way around or partially around the sides and end of wave pool 1. Walkways 34 can be extended above sidewalls 17 and/or along shallow end 9 adjacent to wave pool 1 and are preferably elevated above the surface level of the water (3 meters plus on deep end 5, 1 meter on shallow end 9, and 2 meters in between). Preferably they are higher along deep end 5 than along shallow end 9 to accommodate the higher waves that are created at deep end 5. Several steps 38 can be provided along the length of walkway 34 to change the elevation thereof along the sides. Also, walkways 34 are preferably connected to each deck, 28, 32, (3.5 meters or more above the water surface), with steps 36 leading up to each deck.

Extended along sidewalls 17 (shown on the top and bottom) are preferably several exit areas 40 that allow surfers that have completed their surfing within Zones 10 and 20 to exit from wave pool 1 without having to surf or otherwise traverse from one zone to the next. This is necessary because sidewalls 17 extend up high and make it difficult if not impossible for surfers to climb out of wave pool 1 without using exit areas 40 or travelling all the way to shallow end 9. This is also necessary because each zone is separated from each other by a dividing means, as will be discussed, which prevents surfers from crossing zones and reaching shallow end 9. More detail regarding exit areas 40 will be provided in connection with FIGS. 6a, 6b, 7a, 7b, 8a and 8b.

Figure 2:
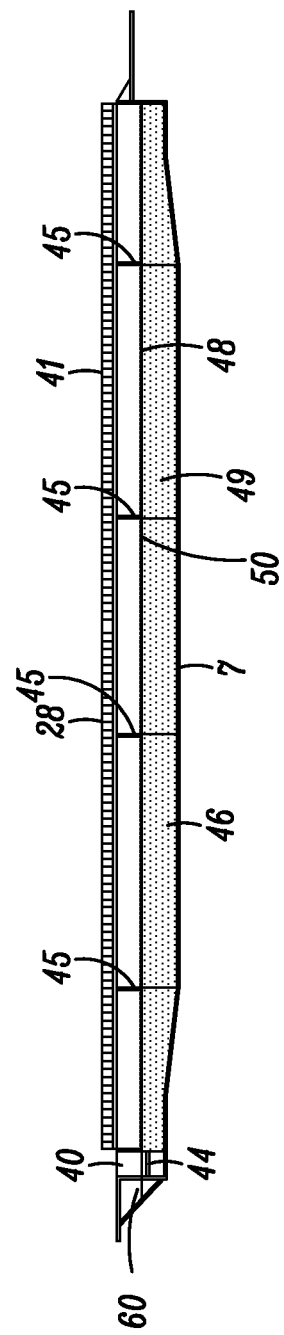
FIG. 2 is a section view taken along B-B of FIG. 1 and represents a section view width-wise taken across the wave pool within Zone 1 facing the first viewing deck.

FIG. 2 is a section view taken along B-B of FIG. 1 width-wise across wave pool 1 within Zone 10 facing deck 28. As can be seen, deck 28 has railings 41 and is extended up above the body of water 46 over wave pool 1 and is supported by multiple columns 45, wherein a safety net 49 and attenuating means 48 (also referred to as Parasitic Surface Wave Energy Attenuating Material or Parasitic Surface Wave Dampening Material) are extended below (extending up from pool floor 7 to the static waterline 50). As will be discussed in greater detail, below each deck 28, 32 is preferably a mesh or grate-like divider or fence, such as safety net 49 and attenuating means 48, shown in dashed lines, which help to separate the zones from each other, wherein preferably, the divider or fence allows water and wave energy to pass through while preventing surfers from crossing over from one zone to the next. This allows the same wave produced by wave generators 3 to travel across wave pool 1 and pass through the various zones to create various wave formations that break, reform into an unbroken swell, and then re-break in the various zones along the length of wave pool 1, while at the same time, helping to keep the zones separated from one another for surfing purposes. Safety net 49 is preferably configured with dual nets on either side of support columns 45 to help protect surfers from colliding into the columns. FIG. 2 shows that pool floor 7 is level throughout its mid-section and even though the floor is shown sloping upward along the sides, the preferred floor has a constant depth across the entire width of wave pool 1. Exit area 40 with ramp 44 having a grated sloped floor is shown on the left hand side.

Figure 3A:
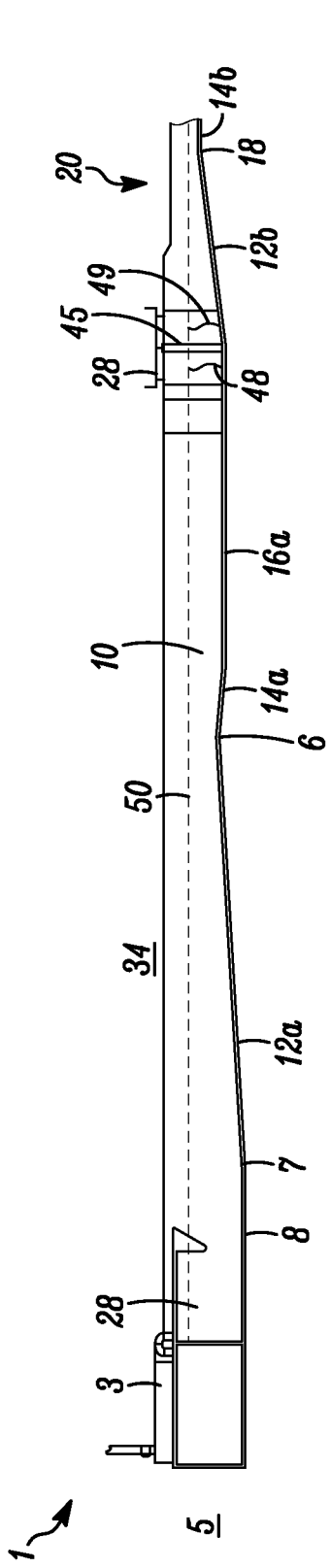
Figure 3B:
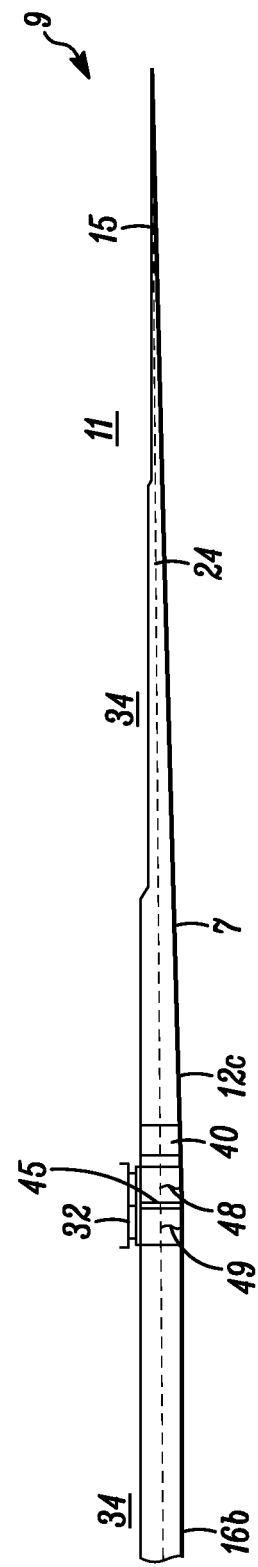

FIGS. 3a and 3b are section views (placed end to end) taken along A-A of FIG. 1 which together represent a single section taken along the length of wave pool 1—FIG. 3a shows the first half and FIG. 3b shows the second half. As can be seen, wave generating caissons 28, and other wave generating equipment, including air storage plenum and machinery units for wave generator 3, are provided on deep end 5 on the left hand side of FIG. 3a, and shoreline 11 and beach 15 with tertiary breaker line 24 are shown on shallow end 9 on the right hand side of FIG. 3b. One of the significant features shown in this figure relates to the slope of pool floor 7 and how it varies from one zone to the next. First, it can be seen in FIG. 3a that pool floor 7 starts on the left hand side in first floor section 8 where wave generators 3 are located, and after being level for a distance, pool floor 7 begins to slope upward until it reaches primary breaker line 6, which in this embodiment is located at a depth of about 2.4 meters. The slope and breaker depth are predetermined such that the appropriate size waves can be created as the wave travels over primary breaker line 6. The wave formations created within Zone 10 are preferably large breaking waves that are suitable for advanced level surfing which is facilitated by the greater depth of Zone 10. Note that pool floor 7 then declines along declined/horizontal section 14a, and levels out downstream along reforming area 16a, i.e., to the right of primary breaker line 6, which helps to allow the waves and wave energy to reform into an unbroken swell and continue travelling forward across wave pool 1 toward Zone 20.

Note that deck 28 extends above the body of water and is supported by columns 45, shown in FIG. 2, wherein safety net 49 and attenuating means 48 (Parasitic Surface Wave Dampening Material) are extended below deck 28. Note that attenuating means 48 preferably comprises a line or rope threaded through parasitic wave dampening members or coils or perforated disks that are spaced a predetermined distance apart from each other, wherein the line or rope is extended or pulled taught across the surface of the body of water. The structure of attenuating means 48 allows longer period surfing waves to travel through it without being affected, while helping to dampen the shorter period spurious waves on the surface of the body of water to reduce choppiness. Extended adjacent to attenuating means 48 but not necessarily connected to it is safety net 49 that helps to prevent surfers from crossing over from one zone to the next, but allows the water and wave energy to pass through relatively uninhibited. Preferably, there are two safety nets 49 and two attenuating means 48 running substantially parallel to each other below deck 28 with support columns 45 situated in between them.

Extending further to the right, in reference to FIG. 3a, secondary breaker line 18 is shown positioned at the peak of inclined section 12b, followed by another declined/horizontal section 14b. Secondary breaker line 18 in this embodiment is preferably located at a depth of about 1.2 meters, although virtually any depth and slope can be used that achieves the desired results, and essentially forms the break area for Zone 20. The slope and breaker depths are preferably predetermined such that the appropriate size wave and break can be created as the waves travel over secondary breaker line 18, wherein Zone 20 is preferably deeper than Zone 30. The wave formations created within Zone 20 are preferably moderately sized breaking waves that are suitable for intermediate level surfing which is facilitated by the depth of this area. Note that pool floor 7 then declines and levels out downstream, i.e., to the right of secondary breaker line 18, which helps to allow the waves and wave energy to reform into an unbroken swell and continue travelling forward after secondary breaker line 18 and toward Zone 30. In this embodiment, secondary breaker line 18 is preferably positioned at about half the depth of primary breaker line 6, although not necessarily so.

As shown in FIG. 3b, pool floor 7 preferably extends substantially horizontally along reforming area 16b for a predetermined distance until it begins to slope up again along inclined section 12c, which is at or near where deck 32 is located. Deck 32 also extends above the body of water, and is supported by multiple columns 45, and has a safety net 49 and attenuating means 48 (Parasitic Surface Wave Dampening Material) extended below it. Note that this attenuating means 48 also preferably comprises a line or rope threaded through parasitic wave dampening members or coils or perforated disks that are spaced a predetermined distance apart from each other, wherein the line or rope is extended or pulled taught across the surface of the body of water. Again, the structure of attenuating means 48 allows the longer period surfing waves to travel through it, while helping to dampen the shorter period spurious waves and their wave energy at the water surface to reduce choppiness. Extended adjacent to attenuating means 48 but not necessarily connected to it is safety net 49 that helps to prevent surfers from crossing over from one zone to the next, but allows the water and wave energy to pass through. Preferably, there are two safety nets 49 and two attenuating means 48 running substantially parallel to each other below deck 32 with support columns 45 situated in between them.

Finally, as shown in FIG. 3b, pool floor 7 gradually slopes upward toward shoreline 11 and beach 15 where tertiary breaker line 24, which extends at the breaker depth for the waves and represents where the waves begin to break onto beach 15, is located. This area is designed for beginner surfers.

Figure 4A:
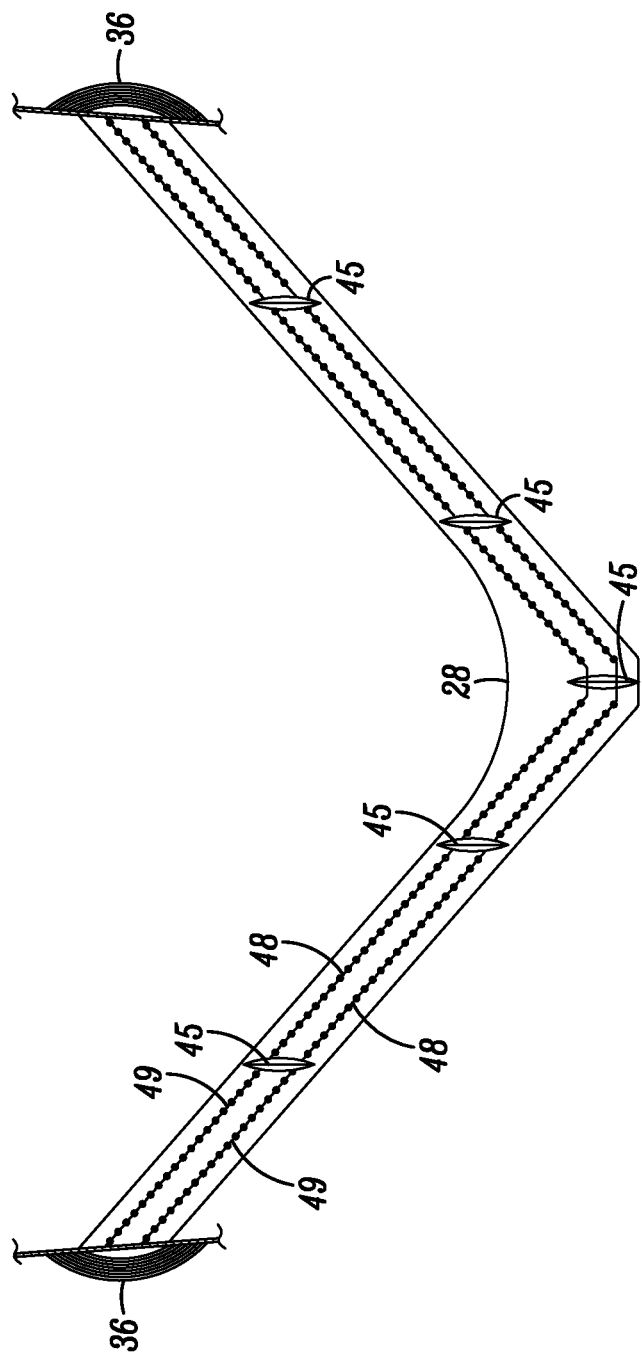
Figure 4B:
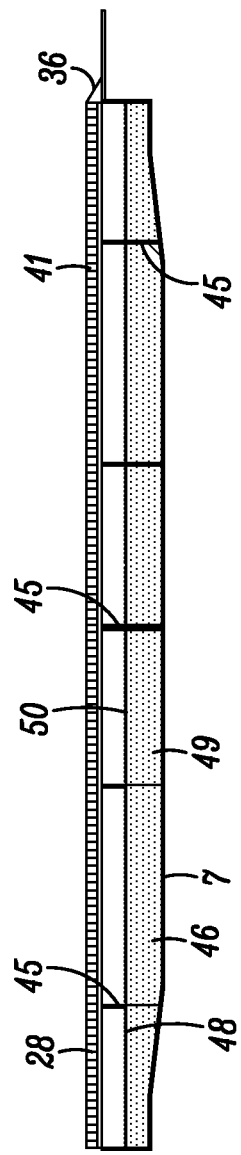

FIG. 4a is a plan view of deck 28 and FIG. 4b is an elevation view. As indicated before, the preferred shape of deck 28 is the shape of a V from above, which corresponds with the plan view shape of Zone 20, with a safety net 49 and attenuating means 48 extended below, such that those standing on deck 28 can view the adjacent zones on either side, where the surfing will take place. At the same time, safety net 49 and attenuating means 48 are hidden from view. There are preferably two safety nets 49 and two attenuating means 48 below deck 28, extended parallel to each other, wherein support columns 45 are preferably positioned inside safety nets 49 to prevent wayward surfers from running into columns 45. Columns 45 are preferably foil shaped as shown to provide less wave resistance. There are preferably steps 36 leading up to deck 28 on either side along walkway 34 and each deck preferably has rails 41.

Figure 5A:
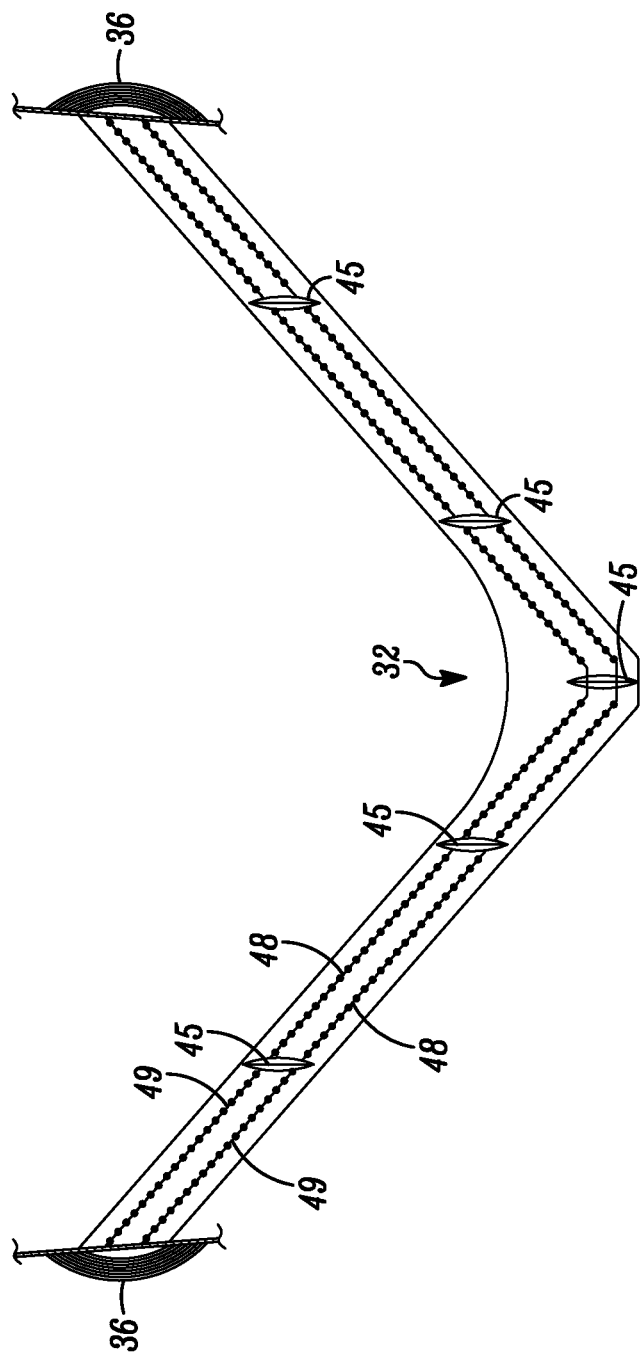
Figure 5B:
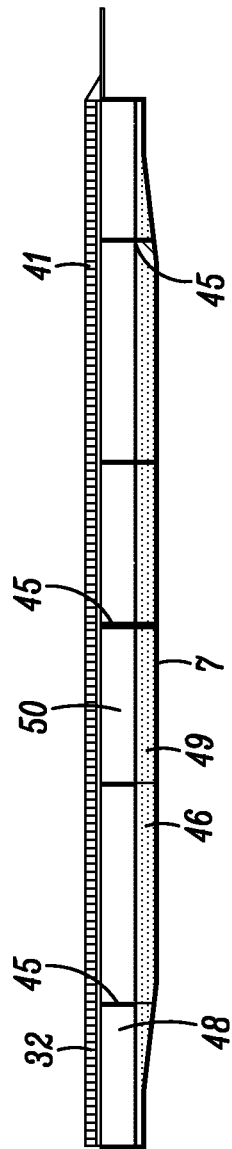

FIG. 5a is a plan view of deck 32 and FIG. 5b is an elevation view. The preferred shape of deck 32 is the shape of a V from above, which corresponds with the plan view shape of Zone 30, with a safety net 49 and attenuating means 48 extended below, such that those standing on deck 32 can view the adjacent zone, i.e., Zone 20, on one side, and beach 15 on the other. At the same time, safety net 49 and attenuating means 48 are hidden from view. There are preferably two safety nets 49 and two attenuating means 48 below deck 32, extended parallel to each other, wherein support columns 45 are preferably positioned inside safety nets 49 to prevent wayward surfers from running into columns 45. Columns 45 are preferably foil shaped as shown to provide less wave resistance. There are preferably steps 36 leading up to deck 32 on either side along walkway 34 and each deck preferably has rails 41. Note that more steps leading to deck 32 are required than those leading to deck 28 due to walkway 34 being lower in elevation at that part of wave pool 1. Also note that the depth of pool floor 7 below deck 32 shown in FIG. 5b is higher than it is under deck 28 as shown in FIG. 4b, primarily because pool floor 7 slopes relatively upward toward beach 15.

Figure 6A:
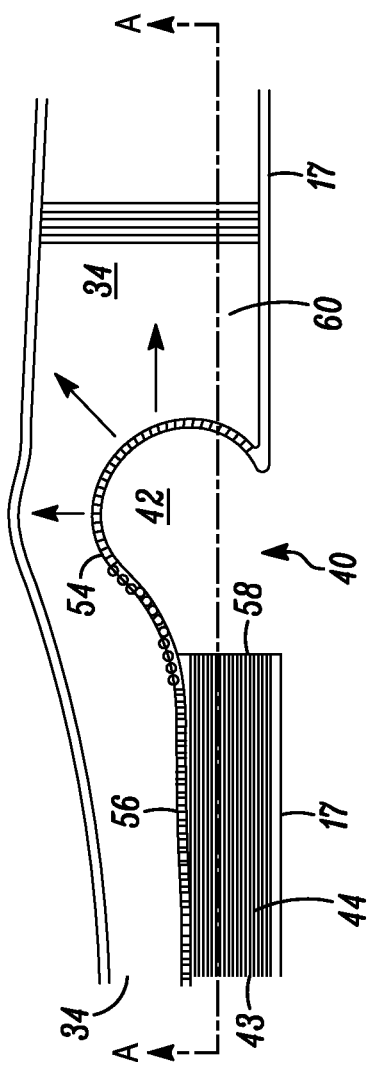
Figure 6B:
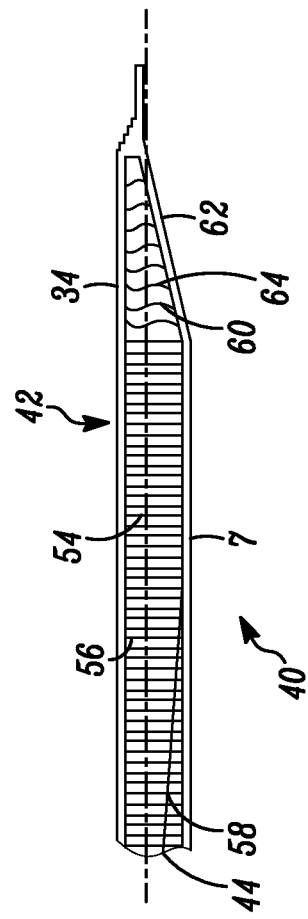

FIGS. 6a and 6b show an embodiment of an exit area 40 in the shape of a key hole, including an inlet or opening 42 along sidewall 17 and an associated channel 43 with a sloped ramp 44 that enables surfers to walk up and onto adjacent walkway 34. Preferably, these exit areas enable surfers to exit from wave pool 1 by swimming or otherwise traversing onto ramp 44 along the various zones, so that they don't have to travel all the way to shallow end 9 to exit, and so that they can walk up and onto walkway 34 directly from the associated zones. Channel 43 preferably has a sidewall 17 that separates it from the body of water as a means of preserving the movement of waves progressing through wave pool 1 with little or no effect. The relatively small size of inlet 42 helps preserve the formation and reformation of waves within wave pool 1, by limiting interference that could otherwise result from waves flowing into inlet 42. Channel 43 with ramp 44 is preferably extended in a direction opposite the forward movement of the waves to limit the effect of wave reflection and other motions that can occur in and around inlet 42.

The size of inlet 42 is preferably kept to a minimum, to minimize its potential negative effect on the formation and progress of the waves. Accordingly, while surfers are allowed to exit, only a small amount of wave energy will be diverted from the waves travelling through wave pool 1 by inlet 42. Sidewalls 17 in such case are preferably extended substantially vertically all the way from pool floor 7 to well above the peak of the waves, and extends substantially longitudinally downstream from deep end 5 to the point where inlets 42 are located, wherein sidewall 17 helps to keep channel 43 and ramp 44 separate from the body of water, thereby allowing the waves to travel as far as possible without being interfered with by inlet 42.

To further minimize the potential negative effect of inlet 42 on the progress of the waves, including potential unwanted wave reflections and motions that can bounce around within wave pool 1 and inlet 42 forming spurious or parasitic waves that can negatively affect the desired smooth surface of larger surfing waves, the present invention preferably comprises multiple wave dampening features in and around exit areas 40, including the following:

First, as shown in FIGS. 6a and 6b, multiple vertical bars 54 forming a grated wall are preferably extended upward from the floor around inlet 42 as well as along the inside wall 56 of channel 43 between ramp 44 and walkway 34. Bars 54 are preferably padded for safety and spaced a predetermined distance apart from one another with a predetermined porosity to allow water to pass through, but at the same time, to help dampen the waves associated with the water movement entering into inlet 42. Note that these types of padded bars 54 are shown in FIG. 6a, i.e., in plan view, as a series of bars forming the shape of inlet 42. In FIG. 6b, an elevation view is provided showing these bars 54 extending vertically upward from the floor toward walkway 34. These padded grate bars 54 can be constructed as described in U.S. Application Ser. No. 61/804,038, filed Mar. 23, 2013, which is incorporated herein by reference.

Second, within channel 43 between sidewall 17 and inner wall 56 (where the vertical padded grate bars 54 are located) ramp 44 is preferably formed using multiple grate bars 58 that form the sloped floor of ramp 44. These grate bars 58 are preferably padded and spaced a predetermined distance apart from one another with a predetermined porosity to allow water to pass through, but at the same time, they can help dampen the wave energy associated with the water movement entering into inlet 42 and reflected therein, wherein, wave energy that reflects off of vertical padded grate bars 54 around inlet 42 and into channel 43 can be further dampened. Note that the preferred slope of ramp 44 is about 1:13, as shown in FIG. 6b, although it can be greater or smaller. FIG. 6a shows ramp 44 as a series of sloped grated bars 58 extending substantially parallel to each other and parallel to sidewall 17 and inner wall 56, wherein in the preferred embodiment, grated bars 58 have a porosity of about 1% to 50% with a preferred porosity of 17% of the total surface area of ramp 44, which helps provide wave dampening and attenuation aspects of the surface. The preferred porosity levels of bars 58 and other aspects of the invention for dampening purposes can be determined in conjunction with the principles described in U.S. application Ser. No. 12/592,464, filed Nov. 25, 2009, which is incorporated herein by reference. The padded grate bars 58 can be constructed as described in U.S. Application Ser. No. 61/804,038, filed Mar. 23, 2013, which is incorporated herein by reference.

Third, a wave dampening chamber 60 is preferably located behind vertical padded grate bars 54 and underneath walkway 34, wherein chamber 60 preferably consists of an internal sloped solid floor 62 that helps to further dampen any wave motions that might pass through vertical grate bars 54 and into chamber 60. In addition, an ancillary wave dampening material consisting of a buoyant mesh or material consisting of vertical slats 64 anchored to sloped floor 62 can be provided within chamber 60, to help further dampen wave motions that might enter chamber 60. These wave dampening materials 64 are shown by wavy lines in FIG. 6b extended inside chamber 60. A cross section of chamber 60 and exit area 40 can be seen in FIG. 2.

Figure 7A:
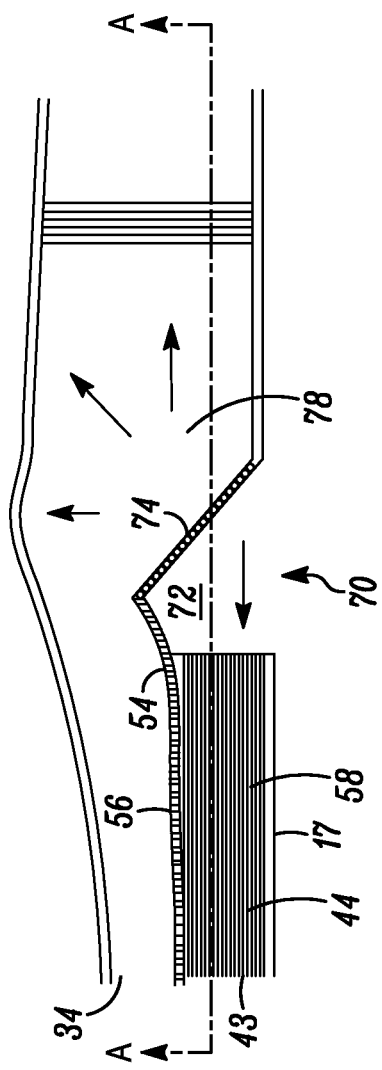
Figure 7B:
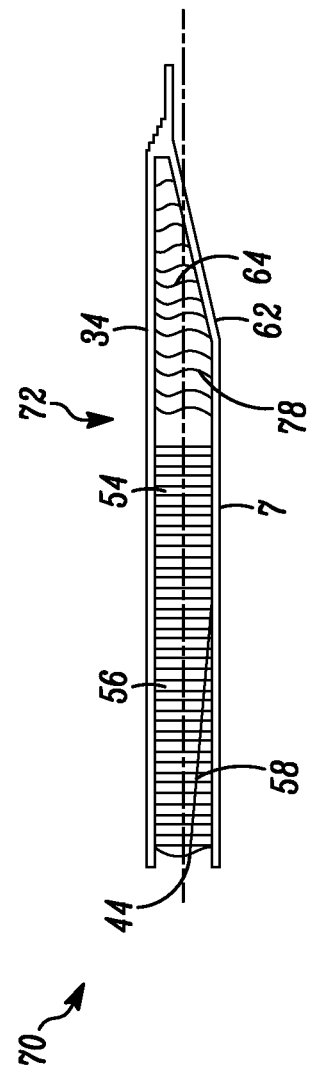

FIGS. 7a and 7b show an alternate embodiment of exit area 70 which enables surfers to exit from wave pool 1 along the various zones. Preferably, this version extends inward within sidewall 17 and enables surfers to exit adjacent the breaker zones so that they don't have to travel all the way to shallow end 9 to exit, but unlike the previous version, this embodiment has an inlet 72 with a straight angled wall 74 that is a continuation of inner wall 56 adjacent channel 43. Angled wall 74 is preferably constructed using vertical padded grate bars 54 that are preferably spaced apart and have a predetermined porosity that allow water to pass through, while at the same time, wave energy can be dampened and/or reflected back toward channel 43 along sidewall 17. Preferably, this embodiment 70 enables surfers to swim or otherwise traverse onto ramp 44 so that they can walk up and onto walkway 34. The width of inlet 72 is preferably kept to a minimum, to minimize the potential negative effect that inlet 72 can have on the waves. Thus, while surfers are allowed to exit, the goal is for only a small amount of wave energy to be diverted from the waves travelling through wave pool 1 and into inlet 72.

When wave energy is reflected back by angled wall 74 to channel 43, preferably, additional wave dampening occurs by virtue of channel 43 and sloped ramp 44 which is preferably formed using multiple padded grate bars 58 that are spaced a predetermined distance apart from one another to allow some water to pass through, while at the same time, help dampen wave energy associated with water movement entering into inlet 72. Again, the slope of ramp 44 is preferably about 1:13, although it can be higher or lower, and preferably, the openings between grate bars 58 comprise about 17% of the total surface area of ramp 44, although not necessarily so. Water bouncing back and forth within channel 43 by virtue of sidewall 17 on one side and inner wall 56 on the other can also help dampen the waves.

To further minimize the potential negative effect that inlet 72 can have on wave formation, this embodiment preferably has additional wave dampening features in and around exit area 70, such as those provided in the previous embodiment, including the following: Multiple vertical padded grate bars 54 forming inner wall 56 can be extended upward from the floor around inlet 72. These grate bars 54 are preferably spaced a predetermined distance apart from one another with a predetermined porosity to allow water to pass through, while at the same time, help dampen wave energy associated with water movement entering into inlet 72. Furthermore, a wave dampening chamber 78 can be located behind angled wall 74 and inner wall 56 and underneath walkway 34, wherein chamber 78 is similar in construction to chamber 60, wherein chamber 78 preferably consists of a sloped solid floor 62 that helps to dampen water movement that passes through vertical grate bars 54 and into chamber 78. In addition, an ancillary wave dampening material consisting of a buoyant mesh or vertical slats 64 anchored to the floor can be provided within chamber 78 to help further dampen wave motion that might enter into chamber 78. These wave dampening materials 64 are shown by the wavy lines in FIG. 7b extended inside chamber 78.

Figure 8A:
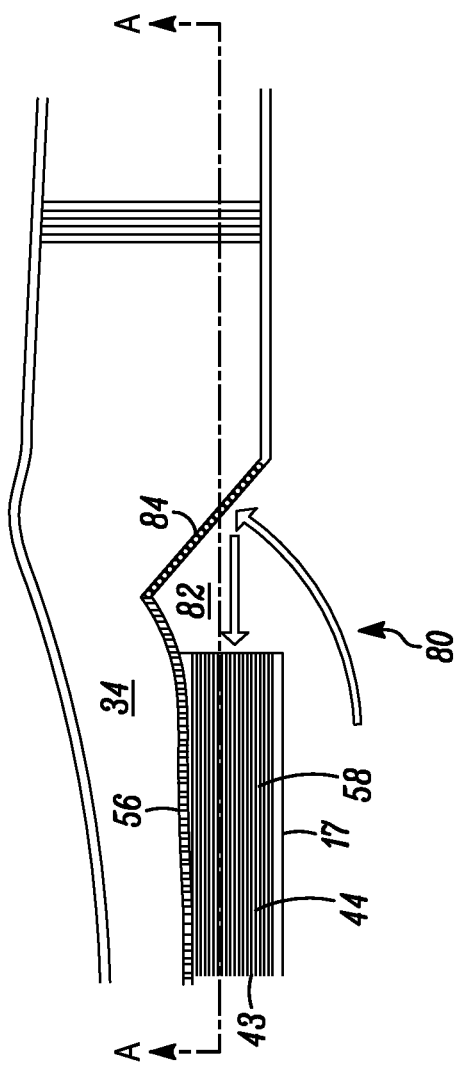
Figure 8B:
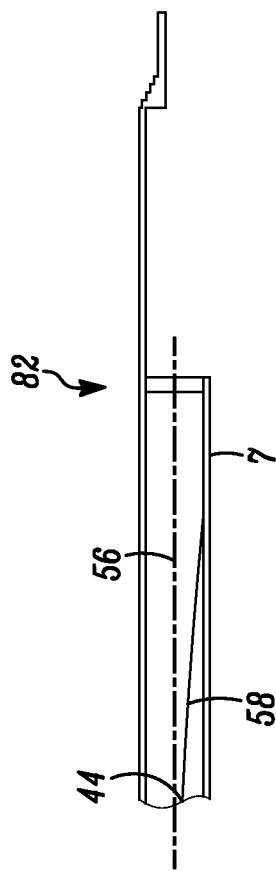

FIGS. 8a and 8b show an alternate embodiment of exit area 80 which enables surfers to exit from wave pool 1 along the various Zones. Preferably, this version has an inlet 82 that extends inward within sidewall 17 and enables surfers to exit adjacent the breaker zones, and like the previous version, this embodiment has a straight angled wall 84, but in this case, wall 84 along with inner wall 56 are preferably solid and do not have vertical padded grate bars 54 extended thereon to allow water to pass. Accordingly, angled wall 84 simply reflects wave energy that enters into inlet 80 toward channel 43, wherein additional wave dampening occurs by virtue of the walls extended on either side of channel 43, and ramp 44 comprising multiple padded grate bars 58 extending upward along a slope. Again, the slope of ramp 44 is preferably about 1:13, and preferably, the openings comprise about 17% of the total surface area of ramp 44, although not necessarily so. Preferably, this embodiment 80 enables surfers to swim or otherwise traverse onto ramp 44 so that they can walk up and onto walkway 34. The width of inlet 80 is preferably kept to a minimum, to minimize the potential negative effect inlet 80 can have on the waves. Thus, while surfers are allowed to exit, only a small amount of wave energy will be diverted from the waves travelling through wave pool 1.

FIG. 9 is a plan view of an alternate wave pool embodiment 100. Unlike the embodiment of FIG. 1, in this embodiment, the side walls 117 on either side (shown at the top and bottom of the drawing) extend substantially parallel to each other such that the waves progress forward without widening as they travel from wave generators 103 toward beach 115, from deep end 105 to shallow end 109. This embodiment also has only two wave breaking zones, i.e., Zones 110 and 120, and only one attenuating barrier between them, and no viewing deck across the width of wave pool 100, although a viewing deck 134 is preferably provided around the perimeter of wave pool 100. It preferably comprises a series of wave generators 103 with wave generating caissons 126 and a pool floor 107 that extends away from wave generators 103 toward shallow end 109 where shoreline 111 and beach 115 are located (shown in relation to the minimum still water line 113). Note that the Beginner Surf Area is to the right of secondary breaker line 118.

Preferably extended across pool floor 107 are multiple wave-breaking zones, i.e., such as Zones 110 and 120, extended back to back, one after the other, which allow different wave formations with different wave characteristics to be created within each zone. As shown in FIG. 9, pool floor 107 preferably begins with a substantially level area 108 near wave generators 103, which is followed by Zone 110, which starts along line 104, and extends upward along inclined section 112a, along a slope of about 1:20, although this can be higher or lower, toward the primary breaker line 106, which preferably extends at the breaker depth for the waves and represents where the waves begin to break. Inclined section 112a is then followed by a declined/horizontal section 114, which is preferably extended substantially horizontally or along a downward slope that is preferably greater than 1:22, which ends along line 102. Thus, Zone 110 is preferably configured in the manner shown in FIG. 9 wherein it begins along line 104, and extends through inclined section 112a, goes through primary breaker line 106, and declined/horizontal section 114a, and ends along line 102, wherein Zone 110 is extended along a V shape from above (symmetrically along a center line represented by A-A).

In FIG. 9, line 104 can be 2.7 meters deep, primary breaker line can be 0.91 meters in depth, and line 102 can be 1.2 meters deep, but those depths are only for exemplary purposes and by no means intended to be limiting. Virtually any range of depths and slopes can be provided as long as the desired effects are produced. In each instance, the depths and slopes can be substantially the same or vary along the width/length of each of the sections, depending on the desired effects.

Then, following line 102, moving from left to right, a wave reforming area 116 is preferably provided which is a relatively deep area (also comprising an Intermediate/Advanced Surf Area) which is where the largest waves break, and which allows the waves that pass through Zone 110 to regenerate and reform, such that they can travel toward Zone 120, where the waves can reform and re-break again. Note that the Intermediate/Advanced Surf Area is generally located closer to line 102, whereas, deep wave reforming area 116 is generally located closer to line 121. These areas are also shown in the elevation view of FIG. 10.

Then, preferably extended downstream from wave reforming area 116 is the next Zone 120 which begins along line 121 and extends upward along inclined section 112b, and through secondary breaker line 118, which preferably extends at the breaker depth for the waves and represents where the waves begin to break toward beach 115. Then, secondary breaker line 118 is followed by shoreline 111, which preferably has an inclined slope of about zero to 1:22, although not necessarily so. Unlike Zone 110, this Zone 120 does not have a declined/horizontal section 114, but instead, the slope of inclined section 112b preferably extends upward to form shoreline 111, and continues upward along the same or similar slope, although not necessarily so, until it reaches the minimum still water line 113 and forms beach 115. This slope preferably extends all the way up from line 121 and onto beach 115, crossing secondary breaker line 118, which is where the waves begin to break and spill onto beach 115. Secondary breaker line 118 also preferably extends along a V shape from above, and is followed by the Beginner Surf Area where smaller waves can spill onto beach 115, which is ideal for those who simply want to wade in the pool. The slope of shoreline 111 preferably continues to extend upward beyond line 113 and toward the far sidewall or edge 138.

In FIG. 9, line 121 can be 1.2 meters deep, and secondary breaker line 118 can be 0.6 meters deep, but those depths are only for exemplary purposes and by no means intended to be limiting. Virtually any range of depths and slopes can be provided as long as the desired effects are produced. Note again that in each instance, the depths and slopes can be substantially the same or vary along the width/length, depending on the desired effects.

Based on the above, the arrangement of pool floor 107 is preferably as follows: Section 108 extends substantially horizontally from wave generators 103 to line 104. Zone 110 preferably extends from line 104, and up along inclined section 112a, through primary breaker line 106, and down declined/horizontal section 114, and ends along line 102, wherein this zone extends in the shape of a V from above. Then, after passing through wave reforming area 116, which represents the Intermediate/Advanced Surf Area, Zone 120 preferably begins along line 121, and extends upward along inclined section 112b, and continues upward through secondary breaker line 118, and onto shoreline 111 and beach 115. Note that the depths shown in FIG. 9 are for exemplary purposes only and are by no means intended to be limiting—wave pool 100 can be designed with virtually any depth or slope that functions in the intended manner.

Figure 10:
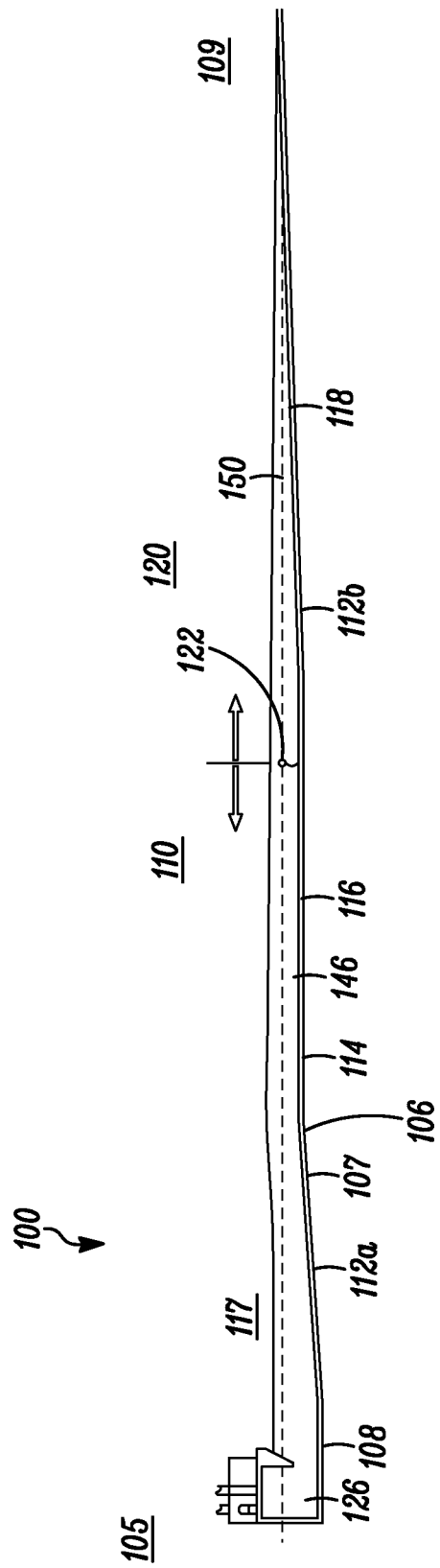
FIG. 10 is a section view taken along A-A of FIG. 9 and represents a section view taken length-wise across the wave pool.

The preferred configuration shown in FIGS. 9 and 10 comprises breaker line depths that gradually decrease from deep end 105 to shallow end 109, i.e., from Zone 110 to Zone 120. The following is an example of one possible range of depths and slopes that can be provided across pool floor 107: Floor section 108 can be 2.7 meters deep, ending along line 104, followed by Zone 110 which begins at inclined section 112a, and extends up along a slope of 1:22, until it reaches primary breaker line 106 at 0.91 meters deep, followed by declined/horizontal section 114, which extends downward along a slope that is greater than 1:22, until it reaches 1.2 meters deep along line 102. This is followed by wave reforming area 116, which is 1.2 meters deep, after which Zone 120 begins along line 121, at 1.2 meters deep, with inclined section 112b extending upward along a slope of 1:22, until it reaches secondary breaker line 118 at 0.6 meters deep, which then continues upward along the same slope, wherein shoreline 111 extends upward through minimum still water line 113, and onto beach 115. In such case, the breaker line depths preferably gradually decrease from 0.91 meters deep along primary breaker line 106, to 0.6 meters deep along secondary breaker line 118, which again are for exemplary purposes only. Additional zones or fewer zones can be provided across wave pool 100 without departing from the present invention.

Figure 11:
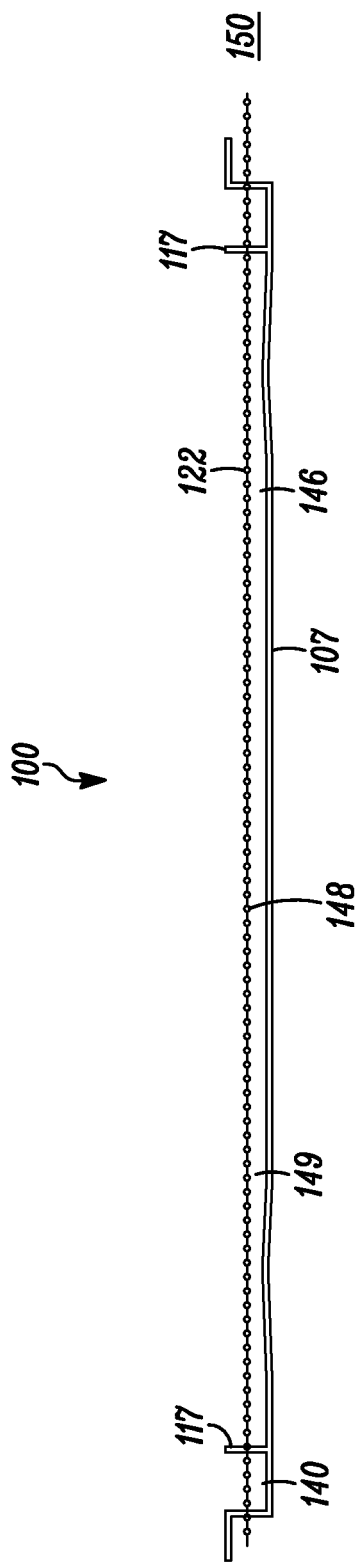
FIG. 11 is a section view taken along B-B of FIG. 9 and represents a section view taken width-wise across the wave pool.

As shown in FIG. 9, between Zones 110 and 120 is preferably a parasitic surface wave energy attenuating barrier 122 that includes a safety net 149 and attenuating means 148, as discussed in connection with the previous embodiment, which in this embodiment, is in the shape of a curve from above as shown. Barrier 122 preferably helps to separate Zone 110 from Zone 120, wherein preferably, barrier 122 allows water and wave energy to pass through while preventing surfers from crossing over from one zone to the next. This allows the same wave produced by wave generator 103 to travel across wave pool 100 and pass through multiple zones to create various wave formations that break, reform, and then re-break along the length of wave pool 100, using the same wave energy. Preferably, as shown in FIG. 11, barrier 122 comprises safety net 149 and attenuating means 148 (Parasitic Surface Wave Dampening Material) similar to those discussed in connection with the previous embodiment, wherein attenuating means 148 preferably comprises a line or rope with multiple members or coils or perforated disks attached to it that are spaced a predetermined distance apart from each other, wherein the line or rope is extended across the surface of the body of water. The structure of attenuating means 148 allows longer period surfing waves to travel through it without being affected, while helping to dampen shorter period parasitic waves at the surface to reduce choppiness. Extended below attenuating means 149 but not necessarily connected to it is safety net 148 that helps to prevent surfers from crossing over from one zone to the next, but allows water and wave energy to pass through. FIG. 11 also shows body of water 146 and static water line 150.

On the right side of barrier 122 is Zone 120 which is preferably extended along inclined section 112b and extends up through secondary breaker line 118, which is also in the shape of a V from above. The beach-head that extends along shallow end 109 forms shoreline 111 and beach 115, wherein the slope extends all the way up from pool floor 107, through minimum still water line 113 along the right hand side. Note that all the depths mentioned, including 1.2 meters for the beginning of inclined section 112b and 0.6 meters for secondary breaker line 118, are exemplary only and are by no means intended to be limiting—wave pool 100 can be designed with virtually any depth and slope that functions in the intended manner. The preferred configuration comprises breaker lines with depths that gradually decrease from Zone 110 to Zone 120, i.e., from 1.2 meters to 0.6 meters.

A walkway 134 is preferably provided around the perimeter of wave pool 100 which allows for spectator viewing. This can extend all the way around for full viewing or partially around the sides and end of wave pool 100. Walkway 134 is preferably elevated above the surface level of the body of water, and is preferably higher on the deep end 105 than on the shallow end 109, to accommodate the higher wave formations that are created by wave generators 103. Note that several steps can be provided along the length of walkway 134 to change the elevation thereof.

As can be seen along walkways 134 and sidewalls 117, there are preferably several exit areas 140 that allow surfers within wave pool 100 to exit without having to surf or traverse all the way to shallow end 109. Each exit area 140 preferably comprises an inlet or opening 142 in sidewalls 117 that allow surfers within the body of water to exit, wherein there is a channel 143 with a sloped ramp 144 that enables surfers to walk up and out onto walkway 134, similar to channel 43 and ramp 44 of the previous embodiments. Channel 143 preferably has a sidewall that separates it from the body of water to preserve the movement of the waves progressing through wave pool 100. Channel 143 with ramp 144 is preferably extended in a direction opposite the forward movement of the waves and has walls on either side, i.e., sidewall 117 on one side and inner wall 156 on the other, and can be provided with a plurality of padded grate bars 158 extending along the slope of ramp 144, so as to limit the effect of spurious wave reflections and motions that can occur in and around inlet 142. Other wave dampening features discussed previously in connection with exit areas 40, 70 and 80, can be provided in connection with exit area 140.

Figure 12:
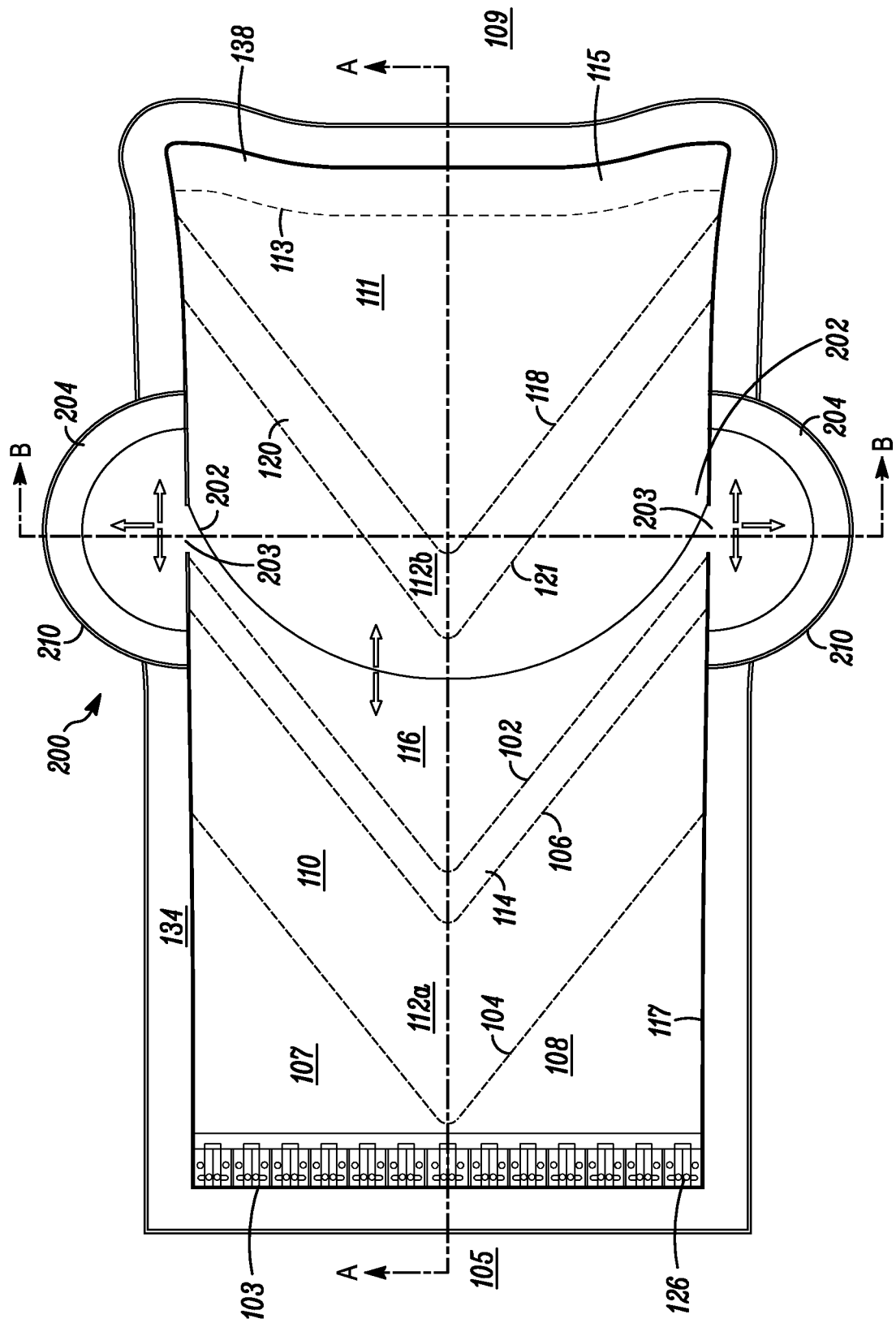
FIG. 12 is a plan view of an embodiment of a wave pool similar to the one shown in FIG. 9, except that this embodiment has an alternate exit area consisting of an opening in the sidewall with a secondary pool associated therewith.

FIG. 12 shows another embodiment of a wave pool 200 similar to the one shown in FIG. 9, in that it has a similar configuration, with similar wave generators 103, similar wave breaking Zones 110 and 120, similar sidewalls 117, similar inclined sections 112a and 112b, similar declined/horizontal section 114, similar wave reforming area 116, similar primary and secondary breaker lines 106 and 118, respectively, and similar walkway 134, etc., but this embodiment 200 has an alternate exit area 202 consisting of an opening 203 in sidewall 117 with a secondary pool 204 associated therewith. Rather than having an inlet with a channel and ramp, as was the case in the previous embodiments, this exit area 202 preferably has an associated secondary pool 204 extended from opening 203, which preferably has a sloped floor (see arrows in secondary pool 204 in FIG. 12) and is large enough to allow the wave energy and wave motions that enter into opening 203 and into secondary pool 204 to be dispersed and therefore dampened. This way, unwanted secondary waves and parasitic surface wave energy that can enter into opening 203 from wave pool 200, which can otherwise be reflected back into wave pool 200, are reduced. Although this embodiment can have other wave dampening features as discussed previously, the shape of secondary pool 204 and sloped floor 205 preferably serve to dampen the waves and motions, such that those other features are unnecessary. This embodiment may or may not have a divider extending between Zones 110 and 120. Although exit area 202 is shown on embodiment 200, it can also be used in conjunction with the embodiment 1 of FIG. 1.

Figure 13:
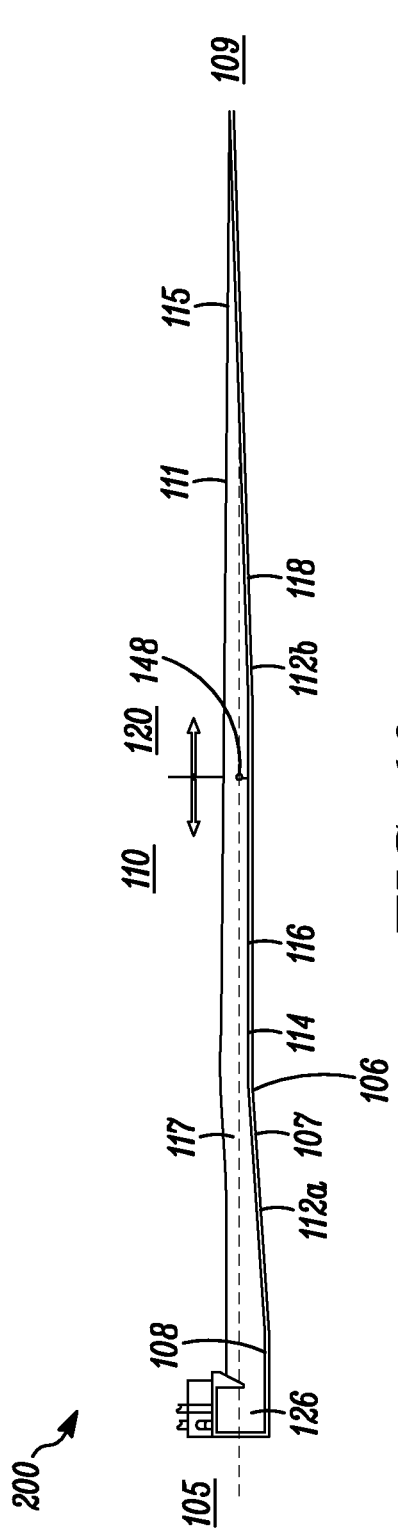

FIGS. 13a and 13b are details of wave pool 200, wherein FIG. 13a is an elevation view taken along section A-A of FIG. 12 and FIG. 13b is an elevation view taken along section B-B of FIG. 12. These views are similar to FIGS. 10 and 11, respectively. For example, FIG. 13a shows deep end 105 having wave generating caissons 126 and horizontal section 108 extending therefrom, followed from left to right by inclined section 112a, primary breaker line 106, and declined/horizontal section 114, which collectively form Zone 110, which is then followed by deep wave reforming area 116, inclined section 112b, and secondary breaker line 118, which collectively form Zone 120, which is followed by shoreline 111 and beach 115. FIG. 13b shows pool floor 107 with body of water 146 and static water line 150, along with attenuating material 148 and safety net 149, which are optional, except that in this embodiment, exit area 202 preferably has a secondary pool 204 associated therewith, wherein each comprises an opening 203, a sloped floor, and a perimeter 210 that defines secondary pool 204.

Figure 14:
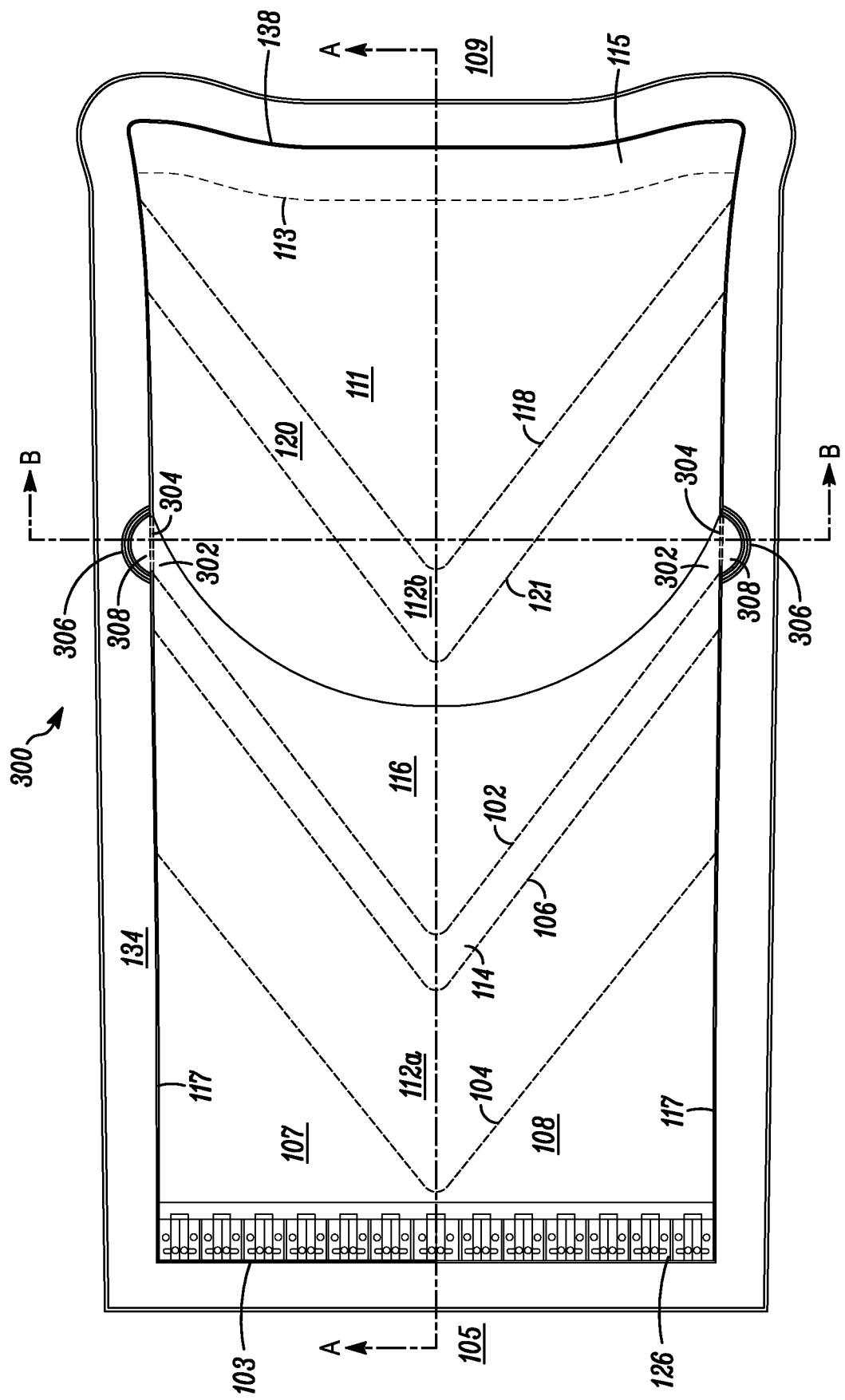
FIG. 14 is a plan view of an embodiment of a wave pool similar to the one shown in FIG. 9, except that this embodiment has an alternate exit area consisting of a lowered wall section and steps leading to a walkway.

FIG. 14 shows another embodiment of a wave pool 300 similar to the one shown in FIG. 9, in that it has a similar configuration, with similar wave generators 103, similar wave breaking Zones 110 and 120, similar sidewalls 117, similar inclined sections 112a and 112b, similar declined/horizontal section 114, similar wave reforming area 116, similar primary and secondary breaker lines 106 and 118, respectively, and similar walkway 134, etc., but this embodiment 300 has an alternate exit area 302 consisting of a lowered wall section 304 extended along sidewall 117, with an exit scallop 308 thereon, wherein rather than having an opening that extends the full height of sidewall 117, exit area 302 preferably only extends up from a predetermined height, which in the preferred embodiment is above the height of static water line 150. That way, when a wave passes by, most of its energy will be retained by sidewall 117, and the wave will not be greatly affected by the open area formed by lowered wall section 304. But because lowered wall section 304 is lower than the rest of sidewall 117, when a wave does pass by, surfers can simply float on top of the wave and easily maneuver to get out. They can then maneuver onto scallop 308, which is preferably a relatively flat cushioned surface, and exit. In this respect, the height of lowered wall section 304 is preferably predetermined such that it retains most of the wave energy of the passing waves, but is low enough that it enables surfers to easily maneuver and exit from wave pool 300 when a wave passes by. Scallop 308 is preferably flat and cushioned to provide safety to surfers who are exiting from wave pool 300. Exit stairs 306 can be provided from exit area 302 leading to walkway 134. This embodiment may or may not have a divider extending between Zones 110 and 120. Although exit area 302 is shown on embodiment 300, it can also be used in conjunction with embodiment 1 of FIG. 1.

Figure 15A:
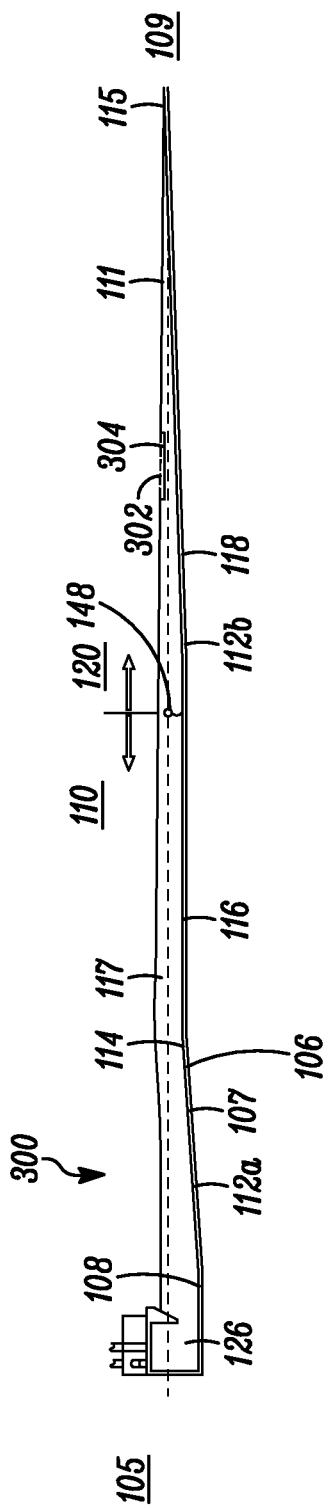
Figure 15B:
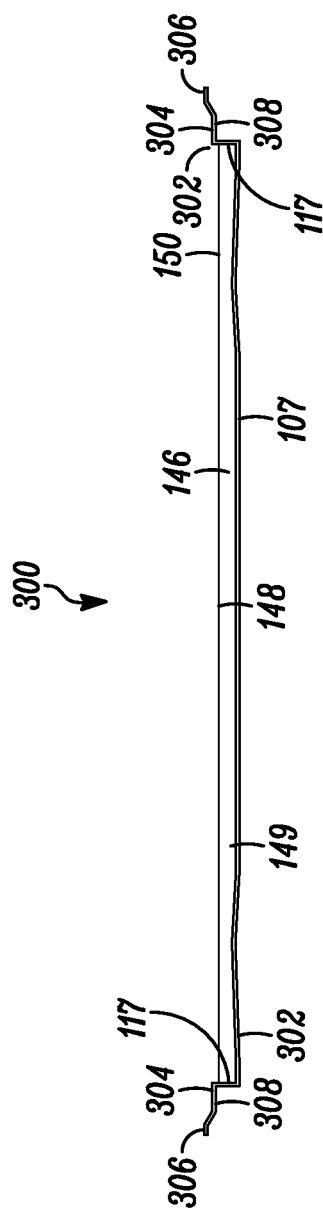

FIGS. 15a and 15b are details of embodiment 300 shown in FIG. 14, wherein FIG. 15a is an elevation view taken along section A-A of FIG. 14, and FIG. 15b is an elevation view taken along section B-B of FIG. 14. These views are similar to FIGS. 10 and 11, respectively. For example, FIG. 15a shows deep end 105 having wave generating caissons 126 and horizontal section 108 extending therefrom, followed from left to right by inclined section 112a, primary breaker line 106, and declined/horizontal section 114, which collectively form Zone 110, which is then followed by deep wave reforming area 116, inclined section 112b, and secondary breaker line 118, which collectively form Zone 120, which is then followed by shoreline 111 and beach 115. However, FIG. 15a shows lowered wall section 302 extended along a top section of sidewall 117, which can be used by surfers to exit from wave pool 300 along the appropriate zone, such as when a wave passes by. FIG. 15b shows pool floor 107 with body of water 146 and static water line 150, along with attenuating material 148 and safety net 149, which are optional, but with exit area 302 comprising a lowered wall section 304 extended along sidewall 117 which allows a surfer to exit as a wave passes by and elevates the surfer high enough to exit through lowered wall section 304. Then, because exit area 302 preferably has an associated scallop 308 with a cushioned surface thereon, and stairs 306, the surfer can exit through exit area 302 and climb onto stairs 306 and onto walkway 134.

Again, rather than having an opening that extends the full height of sidewall 117, exit area 302 preferably only extends up from a predetermined height, which in the preferred embodiment is about the height of static water line 150, such that, when a wave passes by, most of its energy will be retained by sidewall 117, and the wave will not be greatly affected by the open area formed by lowered wall section 304, but at the same time, because lowered wall section 304 is lower than the rest of sidewall 117, when a wave does pass by, surfers can simply float on top of the wave and easily maneuver to get out.

What is claimed is:

1. A wave pool comprising:
   at least one wave generator on a first end of said wave pool, wherein said wave pool has a floor with multiple wave-breaking zones comprising a first wave-breaking zone followed by a second wave-breaking zone extended from said first end toward a second end, opposite said first end, wherein said second wave-breaking zone is shallower than said first wave-breaking zone;
   waves that travel across said floor in a direction from said first end toward said second end, wherein said waves travel through said multiple wave-breaking zones;
   wherein said first wave-breaking zone has a first inclined section that extends up to a first breaker line, which allows said waves to break and form wave characteristics resulting from the configuration of the floor within said first wave-breaking zone;
   a wave reforming area extended between said first and second wave-breaking zones, wherein said wave reforming area has a predetermined floor configuration that extends from said first breaker line to said second wave-breaking zone;
   wherein said waves that travel across said floor travel through said wave reforming area, and are reformed into unbroken swells by the effect of said predetermined floor configuration acting on said waves;
   wherein said second wave-breaking zone has a second inclined section that extends up to a second breaker line, which allows said waves to break again and form wave characteristics resulting from the configuration of the floor within said second wave-breaking zone;
   wherein said second inclined section is shallower than said first inclined section, and said second breaker line is shallower than said first breaker line;
   wherein said wave reforming area comprises a barrier extended transverse to the direction of wave travel, wherein said barrier is adapted to prevent surfers from crossing over from said first wave-breaking zone to said second wave-breaking zone, while allowing the energy of said waves to pass through; and
   wherein said wave reforming area comprises a wave attenuator associated with said barrier, and extended transverse to the direction of wave travel, wherein said wave attenuator has wave dampening members extended along a line extending across said wave pool, wherein said wave dampening members comprise floating members that are adapted to allow longer period waves to travel through, while helping to dampen the shorter period waves on the surface of the water.

2. The wave pool of claim 1, wherein said first and second wave-breaking zones and said wave reforming area are configured in the shape of a V from above, and wherein said barrier and said wave attenuator are similarly extended along the same V shape from above.

3. The wave pool of claim 1, wherein said barrier comprises a grill, grate, safety net or mesh extended across said wave pool, wherein said barrier comprises openings that are sufficiently large enough to allow wave energy to pass through, but small enough to prevent surfers from crossing between said first wave-breaking zone and said second wave-breaking zone.

4. The wave pool of claim 1, further comprising a bridge extended across said wave pool and above said wave reforming area, wherein said bridge allows spectators to view surfers participating in activities within said first and second wave-breaking zones.

5. The wave pool of claim 1, wherein said floor comprises a declined section extended between said first inclined section and said wave reforming area, and wherein said wave reforming area has a horizontal section that follows downstream from said declined section, wherein said horizontal section is adapted to help enable the waves to reform into unbroken swells.

6. The wave pool of claim 1, further comprising an exit area located within said first wave-breaking zone, wherein said exit area enables said surfers in said wave pool to exit from said first wave-breaking zone without having to traverse across said wave pool from said first wave-breaking zone to said second wave-breaking zone.

7. The wave pool of claim 6, further comprising a deck extending from said exit area, wherein said deck enables surfers who exit from said wave pool using said exit area to walk along said deck to exit said wave pool.

8. A wave pool comprising:
   at least one wave generator on a first end of said wave pool, wherein said wave pool has a floor with multiple wave-breaking zones extended from said first end toward a second end, opposite said first end;
   waves that travel across said floor in a direction from said first end toward said second end, wherein said waves travel through said multiple wave-breaking zones;
   wherein each of said multiple wave-breaking zones has an inclined section that extends up to a breaker line, which allows said waves to break and form wave characteristics resulting from the configuration of the floor thereon;
   a wave reforming area having a predetermined floor configuration extended between each of said multiple wave-breaking zones, wherein said waves that travel across said floor travel through said wave reforming area, and are reformed into unbroken swells by the effect of said predetermined floor configuration acting on said waves;

wherein each of said multiple wave-breaking zones varies in depth, and wherein within said multiple wave-breaking zones, each succeeding wave-breaking zone is shallower than a preceding wave-breaking zone, in a direction from said first end toward said second end;

wherein said wave reforming area comprises a barrier that is extended transverse to the direction of wave travel, wherein said barrier is adapted to prevent surfers from crossing between said multiple wave-breaking zones, while allowing the energy of said waves to pass through; and wherein said wave reforming area comprises a wave attenuator associated with said barrier wherein said wave attenuator is extended transverse to the direction of wave travel, and comprises wave dampening members that are extended along a line that extends across said wave pool, wherein said wave dampening members are adapted to allow longer period waves to travel through, while helping to dampen the shorter period waves on the surface of the water.

9. The wave pool of claim 8, wherein said multiple wave-breaking zones and said wave reforming area are configured in the shape of a V from above, and wherein said barrier and said wave attenuator are similarly extended along the same V shape from above.

10. The wave pool of claim 8, wherein said barrier comprises a grill, grate, safety net or mesh extended across said wave pool, wherein said barrier comprises openings that are sufficiently large enough to allow wave energy to pass through, but small enough to prevent surfers from crossing between said multiple wave-breaking zones.

11. The wave pool of claim 8, wherein said multiple wave-breaking zones comprise a first wave-breaking zone and a second wave-breaking zone, with said wave reforming area extended between said first and second wave-breaking zones, wherein said first wave-breaking zone comprises a first inclined section that extends up to a first breaker line, and said second wave-breaking zone has a second inclined section that extends up to a second breaker line, wherein said second inclined section is shallower than said first inclined section, and said second breaker line is shallower than said first breaker line.

12. The wave pool of claim 11, wherein said wave reforming area comprises a horizontal section that extends from said first breaker line to said second wave-breaking zone, wherein said horizontal section is deep enough to enable the waves to reform into unbroken swells.

13. The wave pool of claim 12, wherein a declined section extends between said first wave-breaking zone and said wave reforming area, wherein said declined section extends down from said first breaker line to said horizontal section of said wave reforming area.

14. The wave pool of claim 11, further comprising an exit area located within said first wave-breaking zone, wherein said exit area enables said surfers in said wave pool to exit from said first wave-breaking zone without having to traverse across said wave pool from said first wave-breaking zone to said second wave-breaking zone.

15. The wave pool of claim 14, further comprising a deck extending from said exit area, wherein said deck enables surfers who exit from said wave pool using said exit area to walk along said deck to exit said wave pool.

16. The wave pool of claim 8, further comprising a bridge extended across said wave pool and above said wave reforming area, wherein said bridge allows spectators to view surfers participating in activities within said multiple wave-breaking zones.

\* \* \* \* \*